US011327959B2

(12) United States Patent
Xie

(10) Patent No.: US 11,327,959 B2
(45) Date of Patent: May 10, 2022

(54) DATA PROCESSING METHODS AND SYSTEMS BASED ON BLOCKCHAIN SMART CONTRACT

(71) Applicant: Advanced New Technologies Co., Ltd., George Town (KY)

(72) Inventor: Guilu Xie, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/160,136

(22) Filed: Jan. 27, 2021

(65) Prior Publication Data
US 2021/0149884 A1 May 20, 2021

Related U.S. Application Data

(63) Continuation of application No. PCT/CN2019/119055, filed on Nov. 18, 2019.

(30) Foreign Application Priority Data

Dec. 12, 2018 (CN) .......................... 201811517626.4

(51) Int. Cl.
*G06F 16/00* (2019.01)
*G06F 16/23* (2019.01)
(Continued)

(52) U.S. Cl.
CPC ............ *G06F 16/2379* (2019.01); *G06F 8/41* (2013.01); *G06F 9/45558* (2013.01); *G06F 16/986* (2019.01)

(58) Field of Classification Search
None
See application file for complete search history.

(56) References Cited

U.S. PATENT DOCUMENTS 9,849,364 B2 * 12/2017 Tran .................... A63B 69/36
10,146,792 B1 * 12/2018 Dobrek ............ G06Q 20/0655
(Continued)

FOREIGN PATENT DOCUMENTS

CN    106598549    4/2017
CN    107274186    10/2017
(Continued)

OTHER PUBLICATIONS

Macrinici, Daniel, Cristian Cartofeanu, and Shang Gao. "Smart contract applications within blockchain technology: A systematic mapping study." Telematics and Informatics 35, No. 8 (2018): 2337-2354. (Year: 2018).*
(Continued)

*Primary Examiner* — Farhan M Syed
(74) *Attorney, Agent, or Firm* — Fish & Richardson P.C.

(57) ABSTRACT

A computer-implemented method includes receiving, by a node in a blockchain network from a client node, a service initiation transaction broadcasted to the blockchain network, wherein each node of blockchain network comprises a blockchain virtual machine, an instruction set of the blockchain virtual machine comprises an XML processing instruction, and XML processing logic corresponding to the XML processing instruction is deployed in the blockchain virtual machine, an instruction set of a smart contract compiler comprises the XML processing instruction, and a service smart contract compiled by the smart contract compiler comprises the XML processing instruction, and is deployed in the blockchain network; invoking, using the blockchain virtual machine, the service smart contract; and triggering, using the blockchain virtual machine, execution of the XML processing logic based on the XML processing instruction in the service smart contract to perform an XML processing operation on data to be processed.

20 Claims, 27 Drawing Sheets

(51) Int. Cl.
*G06F 16/958* (2019.01)
*G06F 8/41* (2018.01)
*G06F 9/455* (2018.01)

(56) References Cited

U.S. PATENT DOCUMENTS

| | | | |
|---|---|---|---|
| 2018/0197155 A1* | 7/2018 | Georgen | G06Q 20/023 |
| 2018/0211043 A1* | 7/2018 | Husain | G06Q 10/101 |
| 2018/0218343 A1* | 8/2018 | Kolb | G06Q 20/405 |
| 2018/0218455 A1* | 8/2018 | Kolb | G06Q 20/405 |
| 2018/0218456 A1* | 8/2018 | Kolb | G06Q 30/08 |
| 2019/0087893 A1* | 3/2019 | Pellew | G06Q 20/3825 |
| 2019/0295182 A1* | 9/2019 | Kfir | H04L 9/3239 |
| 2020/0050591 A1* | 2/2020 | Dobrek | H04L 9/3236 |
| 2020/0118068 A1* | 4/2020 | Turetsky | G06Q 20/06 |
| 2020/0118120 A1* | 4/2020 | Hing | G06F 16/27 |
| 2020/0327498 A1* | 10/2020 | Weber | H04L 9/085 |

FOREIGN PATENT DOCUMENTS

| | | |
|---|---|---|
| CN | 108833460 | 11/2017 |
| CN | 107844294 | 3/2018 |
| CN | 108664650 | 10/2018 |
| CN | 108846748 | 11/2018 |
| CN | 108985073 | 12/2018 |
| CN | 110046023 | 7/2019 |
| TW | 201837798 | 10/2018 |

OTHER PUBLICATIONS

Weber, Ingo, Xiwei Xu, Régis Riveret, Guido Governatori, Alexander Ponomarev, and Jan Mendling. "Untrusted business process monitoring and execution using blockchain." In International Conference on Business Process Management, pp. 329-347. Springer, Cham, 2016. (Year: 2016).*
Crosby et al., "BlockChain Technology: Beyond Bitcoin," Sutardja Center for Entrepreneurship & Technology Technical Report, Oct. 16, 2015, 35 pages.
International Search Report and Written Opinion in International Application No. PCT/CN2019/119055, dated Feb. 12, 2020, 10 pages, English Translation.
Nakamoto, "Bitcoin: A Peer-to-Peer Electronic Cash System," www.bitcoin.org, 2005. 9 pages.
PCT International Preliminary Report on Patentability in International Application No. PCT/CN2019/119055, dated Jun. 8, 2021, 10 pages (with English translation).
Buterin, "Ethereum: Platform Review Opportunities and Challenges for Private and Consortium Blockchains," Jun. 2016, retrieved on Apr. 15, 2019, retrieved from URL<https://www.smallake.kr/wp-content/uploads/2016/06/314477721-Ethereum-Platform-Review-Opportunities-and-Challenges-for-Private-and-Consortium-Blockchains.pdf>, 45 pages.
Extended European Search Report in European Application No. 19895089.1, dated Jan. 4, 2022, 15 pages.
GitHub.com [online], "EIP-211," Mar. 2018, retrieved on Dec. 2, 2021, retrieved from URL<https://github.com/ethereum/EIPs/blob/8f40e3414ae61052 fe68ed6ae56b0d626decfc72/EIPS/eip-211.md>, 2 pages.
Peyrott, "An Introduction to Ethereum and Smart Contracts: a Programmable Blockchain," Mar. 2017, retrieved on Apr. 3, 2020, retrieved from URL<https://auth0.com/blog/an-introduction-to-ethereum-and-smart-contracts-part-2/>, 6 pages.

* cited by examiner

DATA PROCESSING METHODS AND SYSTEMS BASED ON BLOCKCHAIN SMART CONTRACT

CROSS-REFERENCE TO RELATED APPLICATIONS

This application is a continuation of PCT Application No. PCT/CN2019/119055, filed on Nov. 18, 2019, which claims priority to Chinese Patent Application No. 201811517626.4, filed on Dec. 12, 2018, and each application is hereby incorporated by reference in its entirety.

TECHNICAL FIELD

Embodiments of the present specification relate to the field of information technologies, and in particular, to data processing methods and systems based on a blockchain smart contract.

BACKGROUND

Currently, deploying a smart contract in a blockchain network established based on the Ethereum protocol can satisfy various online service demands.

In practice, for some service demands, when each node in the blockchain network invokes, by using an Ethereum virtual machine, a smart contract corresponding to the service demand to execute a transaction, the node needs to perform a processing operation on extensible markup language (XML) data. XML is a common data exchange format, and the XML data is data having the data exchange format.

However, the existing Ethereum virtual machine does not support the processing operation on the XML data.

SUMMARY

To solve a problem that an existing Ethereum virtual machine does not support an XML processing operation by default, embodiments of the present specification provide data processing methods and systems based on a blockchain smart contract Technical solutions are as follows:

According to a first aspect of the embodiments of the present specification, a data processing method based on a blockchain smart contract is provided, where an instruction set of a blockchain virtual machine includes an XML processing instruction, and XML processing logic corresponding to the XML processing instruction is deployed in the blockchain virtual machine; an instruction set of a smart contract compiler includes the XML processing instruction, and a service smart contract compiled by using the smart contract compiler includes the XML processing instruction; the service smart contract is deployed in a blockchain network; and the data processing method includes the following: a node in the blockchain network obtains a service initiation transaction, and broadcasts the service initiation transaction to other nodes; when executing the service initiation transaction, each node in the blockchain network invokes the service smart contract by using the blockchain virtual machine; and the node triggers execution of the XML processing logic based on the XML processing instruction in the service smart contract by using the blockchain virtual machine to perform an XML processing operation on data to be processed.

According to a second aspect of the embodiments of the present specification, another data processing method based on a blockchain smart contract is provided, where an instruction set of a blockchain virtual machine includes an XML processing instruction, and XML processing logic corresponding to the XML processing instruction is deployed in the blockchain virtual machine; an instruction set of a smart contract compiler includes the XML processing instruction, a service smart contract compiled by using the smart contract compiler includes a contract identifier of an XML processing smart contract, and the XML processing smart contract is a smart contract pre-deployed in a blockchain network; the service smart contract is deployed in the blockchain network; and the data processing method includes the following: a node in the blockchain network obtains a service initiation transaction, and broadcasts the service initiation transaction to other nodes; when executing the service initiation transaction, each node in the blockchain network invokes the service smart contract by using the blockchain virtual machine; the node invokes the XML processing smart contract based on the contract identifier of the XML processing smart contract in the service smart contract by using the blockchain virtual machine; and the node triggers execution of the XML processing logic based on the XML processing instruction in the XML processing smart contract by using the blockchain virtual machine to perform an XML processing operation on data to be processed.

According to a third aspect of the embodiments of the present specification, a blockchain virtual machine is provided, configured to implement the method in the first aspect and the method in the second aspect, where an instruction set of a smart contract compiler includes an XML processing instruction, and a service smart contract compiled by using the smart contract compiler includes the XML processing instruction.

According to a fourth aspect of the embodiments of the present specification, a smart contract compiler is provided, configured to implement the method in the first aspect, where an instruction set of the smart contract compiler includes an XML processing instruction, and a service smart contract compiled by using the smart contract compiler includes the XML processing instruction.

According to a fifth aspect of the embodiments of the present specification, a smart contract compiler is provided, configured to implement the method in the second aspect, where an instruction set of the smart contract compiler includes an XML processing instruction, a service smart contract compiled by using the smart contract compiler includes a contract identifier of an XML processing smart contract, and the XML processing smart contract is a smart contract pre-deployed in a blockchain network.

According to a sixth aspect of the embodiments of the present specification, a blockchain system is provided, including a blockchain network, where an instruction set of a blockchain virtual machine includes an XML processing instruction, and XML processing logic corresponding to the XML processing instruction is deployed in the blockchain virtual machine; an instruction set of a smart contract compiler includes the XML processing instruction, a service smart contract compiled by using the smart contract compiler includes the XML processing instruction, and the service smart contract is deployed in the blockchain network; a node in the blockchain network obtains a service initiation transaction, and broadcasts the service initiation transaction to other nodes; and when executing the service initiation transaction, each node in the blockchain network invokes the service smart contract by using the blockchain virtual machine, and triggers execution of the XML processing logic based on the XML processing instruction in the service smart contract by using the blockchain virtual machine to perform an XML processing operation on data to be processed.

According to a seventh aspect of the embodiments of the present specification, another blockchain system is provided, including a blockchain network, where an instruction set of a blockchain virtual machine includes an XML processing instruction, and XML processing logic corresponding to the XML processing instruction is deployed in the blockchain virtual machine; an instruction set of a smart contract compiler includes the XML processing instruction, a service smart contract compiled by using the smart contract compiler includes a contract identifier of an XML processing smart contract, the XML processing smart contract is a smart contract pre-deployed in the blockchain network, and the service smart contract is deployed in the blockchain network; a node in the blockchain network obtains a service initiation transaction, and broadcasts the service initiation transaction to other nodes; and when executing the service initiation transaction, each node in the blockchain network invokes the service smart contract by using the blockchain virtual machine, invokes the XML processing smart contract based on the contract identifier of the XML processing smart contract in the service smart contract by using the blockchain virtual machine, and triggers execution of the XML processing logic based on the XML processing instruction in the XML processing smart contract by using the blockchain virtual machine to perform an XML processing operation on data to be processed.

In the technical solutions provided in the embodiments of the present specification, in one aspect, the XML processing instruction is defined and added to the instruction set of the blockchain virtual machine. In addition, the XML processing logic corresponding to the XML processing instruction is deployed in the blockchain virtual machine. In another aspect, the defined XML processing instruction further needs to be added to the instruction set of the smart contract compiler, so the service smart contract compiled by using the smart contract compiler includes the XML processing instruction.

As such, if the service smart contract is deployed in the blockchain network, when constructing the service initiation transaction, a user can specify to invoke the service smart contract to execute the service initiation transaction at the same time. Therefore, when executing the service initiation transaction, the virtual machine invokes the service smart contract, and triggers execution of the pre-deployed XML processing logic based on the XML processing instruction in the service smart contract.

In the embodiments of the present specification, the instruction sets of the blockchain virtual machine and the smart contract compiler are expanded, so the blockchain virtual machine can support the XML processing operation by default.

It should be understood that the previous general description and the following detailed description are merely examples and illustrative, and cannot limit the embodiments of the present specification.

In addition, any one of the embodiments of the present specification does not need to achieve all the previous effects.

BRIEF DESCRIPTION OF DRAWINGS

To describe the technical solutions in the embodiments of the present specification or in the existing technology more clearly, the following briefly describes the accompanying drawings needed for describing the embodiments or the existing technology. Clearly, the accompanying drawings in the following description merely show some embodiments of the present specification, and a person of ordinary skill in the art can still derive other drawings from these accompanying drawings.

DESCRIPTION OF EMBODIMENTS

Figure 1:
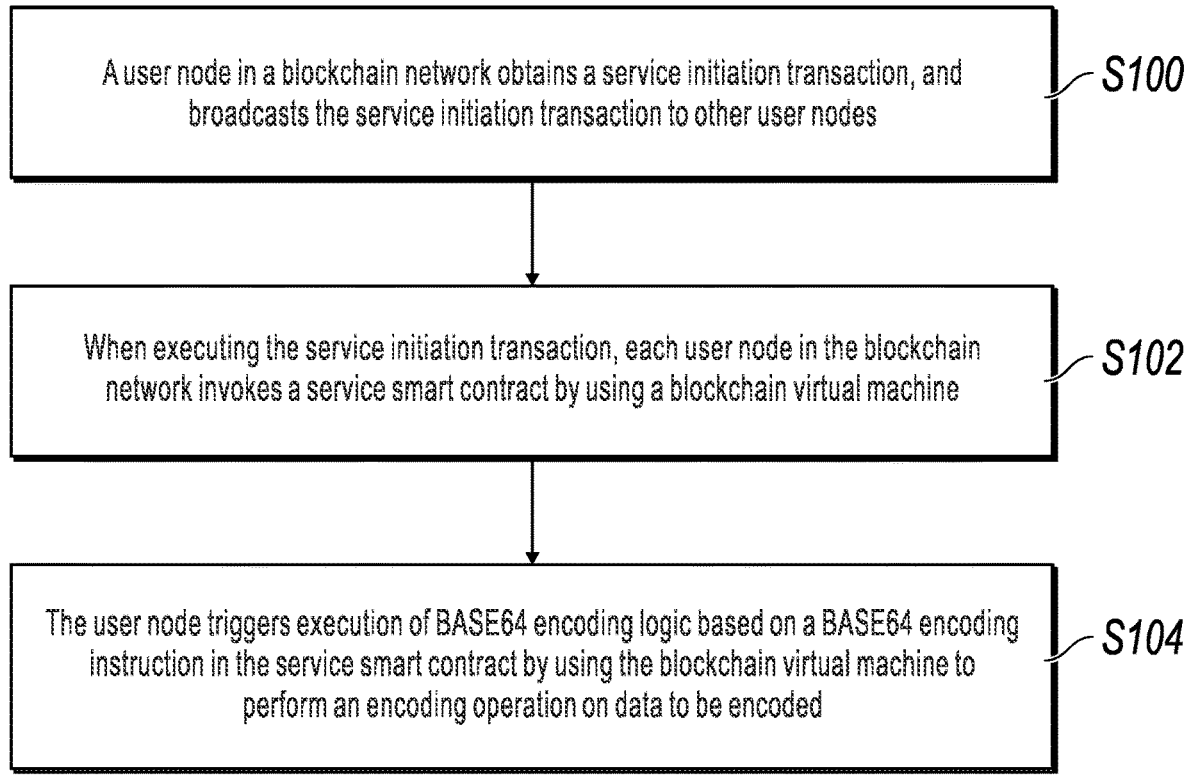
FIG. 1 is a schematic flowchart illustrating an encoding method based on a blockchain smart contract, according to some embodiments of the present specification.

In the present specification, a blockchain virtual machine is an execution program on which each blockchain node depends when executing a transaction. The blockchain virtual machine provides an execution environment for a blockchain transaction.

It is worthwhile to note that the blockchain virtual machine can be an Ethereum virtual machine (EVM) recorded in the Ethereum protocol, or can be a virtual machine in blockchain protocols other than the Ethereum protocol.

In the present specification, a smart contract compiler is a program used to compile a smart contract written in a programming language (such as the Solidity language) into a machine language (such as bytecode or binary code) that the blockchain virtual machine can recognize and execute. It is worthwhile to note that a smart contract deployed in a blockchain network is generally a smart contract compiled by using the smart contract compiler, namely, a smart contract in the form of bytecode or binary code.

In the Ethereum protocol or other blockchain protocols similar to the Ethereum protocol, the blockchain virtual machine locally maintains a mapping relationship (as shown in Table 1 below) between several groups of instructions and operations, and code logic of each operation in Table 1 is further locally deployed in the blockchain virtual machine. Instruction 1 to instruction N are instructions supported by the blockchain virtual machine by default, and instruction 1 to instruction N form an instruction set of the blockchain virtual machine. When invoking a smart contract, if reading any one of the instructions in Table 1 from the smart contract, the blockchain virtual machine triggers execution of code logic of an operation corresponding to the instruction. It is worthwhile to note that the instruction described in the present specification is generally in the form of bytecode or binary code.

TABLE 1

| Instruction 1 | Operation 1 |
| Instruction 2 | Operation 2 |
| Instruction 3 | Operation 3 |
| ... | ... |
| Instruction N | Operation N |

Therefore, if the blockchain virtual machine is expected to perform any one of the operations in Table 1, an instruction corresponding to the operation needs to be written in advance into a smart contract to be invoked by the blockchain virtual machine. It means that when compiling the smart contract in advance, the smart contract compiler can compile, into a corresponding instruction, content that is declared in the smart contract (written in the programming language) to implement any one of the operations in Table 1, so the blockchain virtual machine can recognize the instruction. As such, the smart contract compiler also needs to support instruction 1 to instruction N in Table 1 by default, and instruction 1 to instruction N form an instruction set of the smart contract compiler.

In summary, in the Ethereum protocol or other blockchain protocols similar to the Ethereum protocol, the blockchain virtual machine, the smart contract compiler, and the smart contract generally cooperate to implement a specific service demand.

However, an existing EVM locally supports limited operations by default, but service demands are complex and diverse. For example, the existing EVM and Ethereum smart contract compiler do not support the following operations by default, and consequently, some service demands that depend on the following operations cannot be implemented in an existing Ethereum architecture:

1. Encoding/decoding operation based on 64 printable characters (BASE64).

2. RSA signature verification operation: In 1977, the RSA algorithm was proposed by Ronald Ron Rivest, Adi Shamir, and Leonard Adleman, and the RSA algorithm was thus named.

3. Processing operation of JavaScript Object Notation (JSON) data: JSON is a common data exchange format, and the JSON data is data having the data exchange format.

4. Processing operation of extensible markup language (XML) data: XML is a common data exchange format, and the XML data is data having the data exchange format.

5. Operation of obtaining a transaction hash of a currently executed transaction.

6. For a transfer transaction, when asset balance of a transferor and a transfer amount are not exposed, it is determined whether the asset balance of the transferor is sufficient to cover the transfer amount of the transfer transaction.

The existing EVM and Ethereum smart contract compiler do not support the previous operations by default. Therefore, in the existing technologies, code logic for implementing any one of the previous operations is generally written into the smart contract directly, so when executing the transaction, the EVM invokes the smart contract to execute the code logic of the operation. That is, although the EVM does not support the previous operations by default, the EVM can also perform the previous operations by writing the logic code of the previous operations into the smart contract and enabling the EVM to invoke the smart contract.

However, in practice, the EVM is less efficient in executing the code logic in the smart contract than directly executing the locally pre-deployed code logic.

A core idea of the present application is as follows: In one aspect, the instruction set of the blockchain virtual machine is expanded to increase instructions corresponding to the previous operations, and the code logic corresponding to the previous operations are locally pre-deployed in the blockchain virtual machine, so the blockchain virtual machine can support the previous operations by default. In another aspect, the instruction set of the smart contract compiler is also expanded to increase the instructions corresponding to the previous operations. For the same operation, an instruction that corresponds to the operation and that is added to the instruction set of the blockchain virtual machine should be consistent with an instruction that corresponds to the operation and that is added to the instruction set of the smart contract compiler. Details are shown in Table 2.

TABLE 2

| Instruction 1 | Operation 1 |
| Instruction 2 | Operation 2 |
| Instruction 3 | Operation 3 |
| BASE64 encoding instruction | BASE64 encoding operation |
| ... | ... |
| Instruction N | Operation N |

As such, in an example of the previous BASE64 encoding operation, when the smart contract is written in the programming language, invoking of the BASE64 encoding operation is declared in the smart contract, so the smart contract compiler compiles the declaration into the BASE64 encoding instruction when compiling the smart contract. After the smart contract is deployed in the blockchain network, a user can specify to invoke the smart contract in a service initiation transaction when initiating a service. As such, when executing the service initiation transaction, the blockchain virtual machine invokes the smart contract, and triggers execution of corresponding BASE64 encoding logic locally when reading the BASE64 encoding instruction from the smart contract, to implement the BASE64 encoding operation.

To make a person skilled in the art better understand the technical solutions in the embodiments of the present specification, the following describes in detail the technical solutions in the embodiments of the present specification with reference to the accompanying drawings in the embodiments of the present specification. Clearly, the described embodiments are merely some but not all of the embodiments of the present specification. All other embodiments obtained by a person of ordinary skill in the art based on the embodiments of the present specification shall fall within the protection scope of the present specification.

The technical solutions provided in the embodiments of the present specification are described in detail below with reference to the accompanying drawings. It is worthwhile to note that because the following embodiments are based on similar technical ideas, the following embodiments can be understood with reference to each other.

Embodiment 1

FIG. 1 is a schematic flowchart illustrating an encoding method based on a blockchain smart contract, according to some embodiments of the present specification. The method includes the following steps:

S100: A node in a blockchain network obtains a service initiation transaction, and broadcasts the service initiation transaction to other nodes.

S102: When executing the service initiation transaction, each node in the blockchain network invokes a service smart contract by using a blockchain virtual machine.

S104: The node triggers execution of BASE64 encoding logic based on a BASE64 encoding instruction in the service smart contract by using the blockchain virtual machine to perform an encoding operation on data to be encoded.

In some embodiments, the blockchain network needs to be pre-configured, so the following can be implemented:

(1) An instruction set of the blockchain virtual machine includes the BASE64 encoding instruction, and the BASE64 encoding logic corresponding to the BASE64 encoding instruction is deployed in the blockchain virtual machine.

(2) An instruction set of a smart contract compiler includes the BASE64 encoding instruction, and the service smart contract compiled by using the smart contract compiler includes the BASE64 encoding instruction.

(3) The service smart contract is deployed in the blockchain network.

The service smart contract is a smart contract corresponding to a service that needs to invoke a BASE64 encoding function.

In the embodiments of the present specification, the blockchain network includes a plurality of nodes. From the perspective of software, a node is a blockchain program used to implement a blockchain function. From the perspective of hardware, a node is user device installing with a blockchain program. In practice, each node can be connected to at least one client device (or wallet), and a transaction in the blockchain is usually constructed by the client device.

The transaction described in the embodiments of the present specification is a piece of data that is created by a user by using the client device in the blockchain and that needs to be finally published to a distributed database in the blockchain. The transaction is a data structure agreed in the blockchain protocol. A piece of data needs to be encapsulated into a transaction before the data is stored in the blockchain.

Transactions in the blockchain include a transaction in a narrow sense and a transaction in a broad sense. The transaction in the narrow sense is value transfer published by the user to the blockchain. For example, in a conventional Bitcoin blockchain network, a transaction can be transfer initiated by the user in the blockchain. The transaction in the broad sense is service data that is published by the user to the blockchain and that has a service intention. For example, an operator can establish a consortium blockchain based on actual service demands, and deploy some other types of online services (such as a house rental service, a vehicle scheduling service, an insurance claim service, a credit service, and a medical service) that are not related to value transfer in the consortium blockchain. In the consortium blockchain, a transaction can be a service message or a service request that is published by the user in the consortium blockchain and that has a service intention.

In the blockchain network, the user usually initiates a service in the form of a transaction. Specifically, the node needs to obtain the service initiation transaction if the previous service smart contract is not the only smart contract deployed in the blockchain network, and the service initiation transaction further indicates a contract identifier of the service smart contract, to specify the smart contract that needs to be invoked when the transaction is executed.

The service initiation transaction is usually constructed and sent by the user to the node by using the client device. Generally, client devices connected in the blockchain network are in a one-to-one correspondence with users.

After the node broadcasts the service initiation transaction to other nodes, each node receives the service initiation transaction, and then needs to invoke, by using the blockchain virtual machine, the service smart contract to execute the service initiation transaction. It is worthwhile to note here that in the blockchain network, a blockchain virtual machine is deployed on each node. When the node executes a transaction, the blockchain virtual machine deployed on the node actually executes the transaction.

In Embodiment 1, after invoking the service smart contract, the blockchain virtual machine reads bytecode or binary code in the service smart contract, and executes the bytecode or the binary code. When the blockchain virtual machine reads the BASE64 encoding instruction in the service smart contract, it is equivalent to determining that a BASE64 encoding operation needs to be performed. Therefore, the blockchain virtual machine triggers execution of the locally pre-deployed BASE64 encoding logic to perform an encoding operation on the data to be encoded.

In practice, depending on a specific service demand, the data to be encoded can be included in the service initiation transaction, can be included in the service smart contract, or can be generated when the blockchain virtual machine executes the service initiation transaction.

Furthermore, in addition to executing the service initiation transaction by using the blockchain virtual machine, each node further needs to write the service initiation transaction into the blockchain based on a consensus mechanism.

In addition, it is worthwhile to that if the blockchain virtual machine triggers execution of the BASE64 encoding logic based on the BASE64 encoding instruction in the service smart contract, a stack transfer method (that is, data obtained after BASE64 encoding is usually written into a stack) is usually used in an execution process for data transfer. However, a data length of the data obtained after BASE64 encoding is not fixed. If the stack transfer method is used, a corresponding BASE64 encoding instruction needs to be predetermined for each possible data length. This is relatively complex to implement.

Therefore, the following Embodiment 2 provides another encoding method based on a blockchain smart contract.

Embodiment 2

Figure 2:
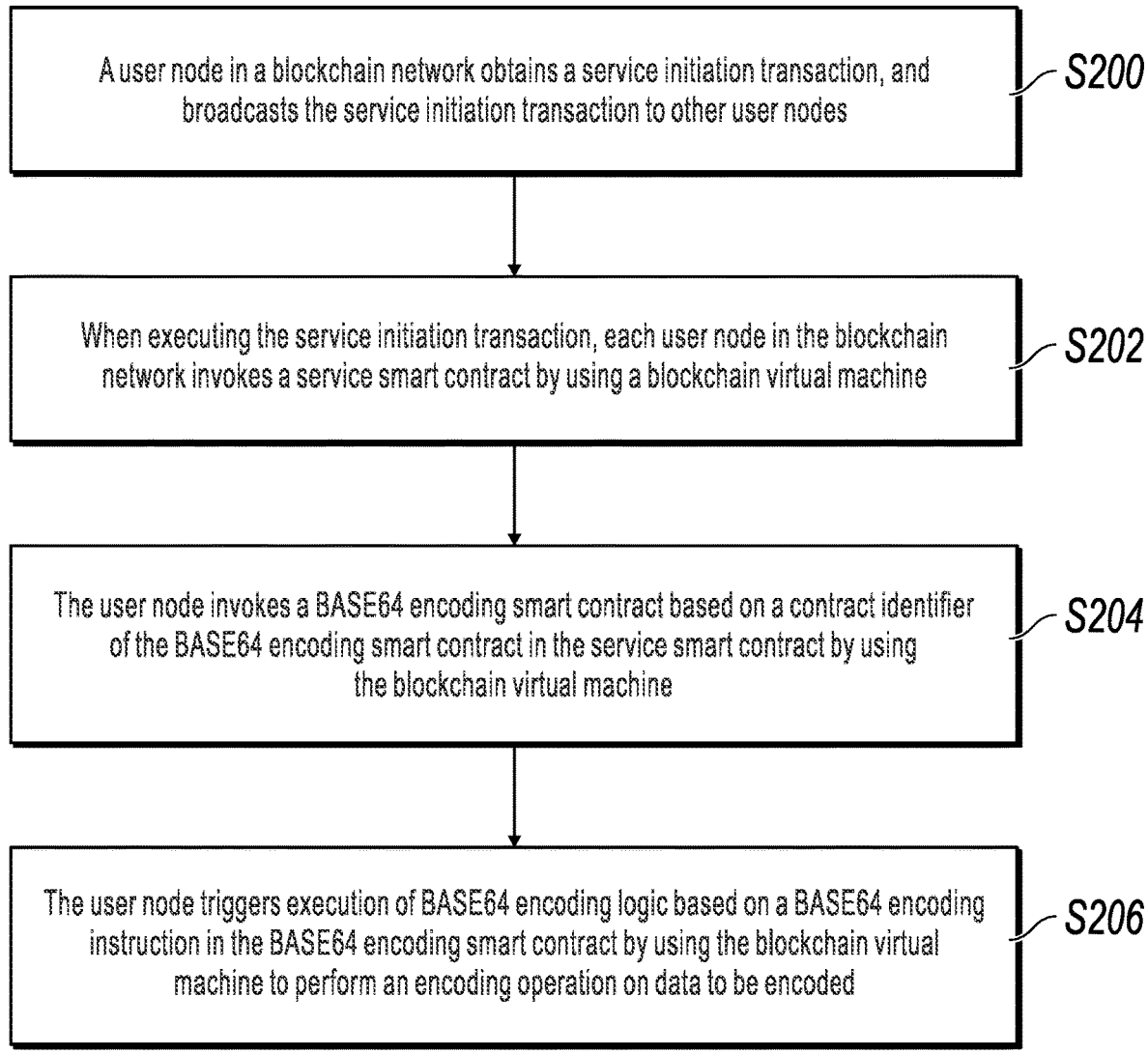
FIG. 2 is a schematic flowchart illustrating another encoding method based on a blockchain smart contract, according to some embodiments of the present specification.

FIG. 2 is a schematic flowchart illustrating another encoding method based on a blockchain smart contract, according to some embodiments of the present specification. The method includes the following steps:

S200: A node in a blockchain network obtains a service initiation transaction, and broadcasts the service initiation transaction to other nodes.

S202: When executing the service initiation transaction, each node in the blockchain network invokes a service smart contract by using a blockchain virtual machine.

S204: The node invokes a BASE64 encoding smart contract based on a contract identifier of the BASE64 encoding smart contract in the service smart contract by using the blockchain virtual machine.

S206: The node triggers execution of BASE64 encoding logic based on a BASE64 encoding instruction in the BASE64 encoding smart contract by using the blockchain virtual machine to perform an encoding operation on data to be encoded.

In some embodiments, the blockchain network needs to be pre-configured, so the following can be implemented:

(1) An instruction set of the blockchain virtual machine includes the BASE64 encoding instruction, and the BASE64 encoding logic corresponding to the BASE64 encoding instruction is deployed in the blockchain virtual machine.

(2) An instruction set of a smart contract compiler includes the BASE64 encoding instruction, the service smart contract compiled by using the smart contract compiler includes the contract identifier of the BASE64 encoding smart contract, and the BASE64 encoding smart contract is a smart contract pre-deployed in the blockchain network.

(3) The service smart contract is deployed in the blockchain network.

A difference between Embodiment 2 and Embodiment 1 mainly lies in the following: In Embodiment 2, after the blockchain virtual machine invokes the service smart contract, when the blockchain virtual machine reads the contract identifier of the BASE64 encoding smart contract, it is equivalent to determining that the BASE64 encoding smart contract needs to be further invoked. The blockchain virtual machine invokes the BASE64 encoding smart contract, and also reads bytecode or binary code in the BASE64 encoding smart contract. When the blockchain virtual machine reads the BASE64 encoding instruction, it is equivalent to determining that a BASE64 encoding operation needs to be performed. Therefore, the blockchain virtual machine triggers execution of the locally pre-deployed BASE64 encoding logic to perform an encoding operation on the data to be encoded.

That is, in Embodiment 2, when the smart contract compiler compiles the service smart contract, if the smart contract compiler finds that invoking of the BASE64 encoding operation is declared in the service smart contract, the smart contract compiler compiles the declaration into the contract identifier of the BASE64 encoding smart contract instead of the BASE64 encoding instruction. As such, when invoking the service smart contract, the blockchain virtual machine further invokes the BASE64 encoding smart contract.

In the field of blockchain technologies, the BASE64 encoding smart contract is actually a precompiled contract. When invoking and executing a precompiled contract such as the BASE64 encoding smart contract, the blockchain virtual machine does not transfer a parameter by using a stack transfer method, but transfers the parameter by using a memory transfer method (which supports reading and writing of data having an unfixed length).

Embodiment 3

Figure 3:
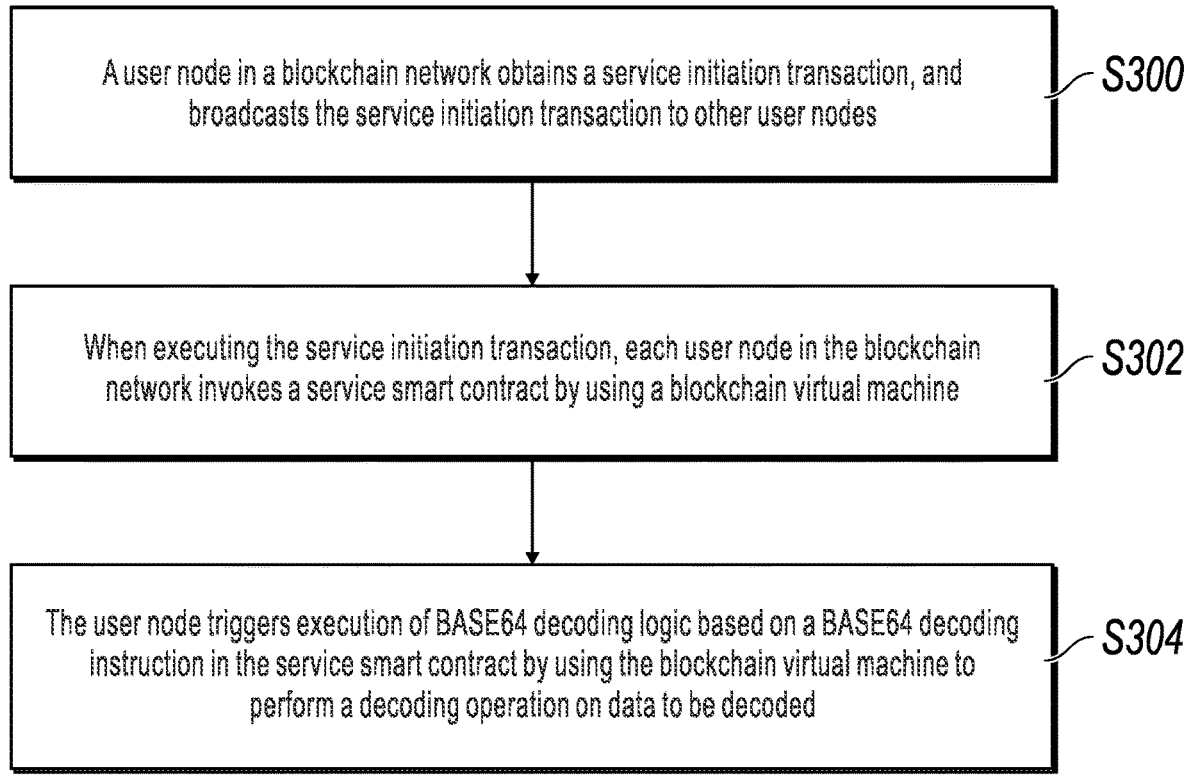
FIG. 3 is a schematic flowchart illustrating a decoding method based on a blockchain smart contract, according to some embodiments of the present specification.

FIG. 3 is a schematic flowchart illustrating an encoding method based on a blockchain smart contract, according to some embodiments of the present specification. The method includes the following steps:

S300: A node in a blockchain network obtains a service initiation transaction, and broadcasts the service initiation transaction to other nodes.

S302: When executing the service initiation transaction, each node in the blockchain network invokes a service smart contract by using a blockchain virtual machine.

S304: The node triggers execution of BASE64 decoding logic based on a BASE64 decoding instruction in the service smart contract by using the blockchain virtual machine to perform a decoding operation on data to be decoded.

In some embodiments, the blockchain network needs to be pre-configured, so the following can be implemented:

(1) An instruction set of the blockchain virtual machine includes the BASE64 decoding instruction, and the BASE64 decoding logic corresponding to the BASE64 decoding instruction is deployed in the blockchain virtual machine.

(2) An instruction set of a smart contract compiler includes the BASE64 decoding instruction, and the service smart contract compiled by using the smart contract compiler includes the BASE64 decoding instruction.

(3) The service smart contract is deployed in the blockchain network.

Because the BASE64 decoding operation and the BASE64 encoding operation are a group of operations that correspond to each other, for related descriptions, references can be made to Embodiment 1. Details are not omitted for simplicity.

It is worthwhile to note that in practice, depending on a specific service demand, the data to be decoded can be included in the service initiation transaction, can be included in the service smart contract, or can be generated when the blockchain virtual machine executes the service initiation transaction.

In addition, the previous problem, implementation of stack transfer is complex, also exists in Embodiment 3. Therefore, the following Embodiment 4 provides another decoding method based on a blockchain smart contract.

Embodiment 4

Figure 4:
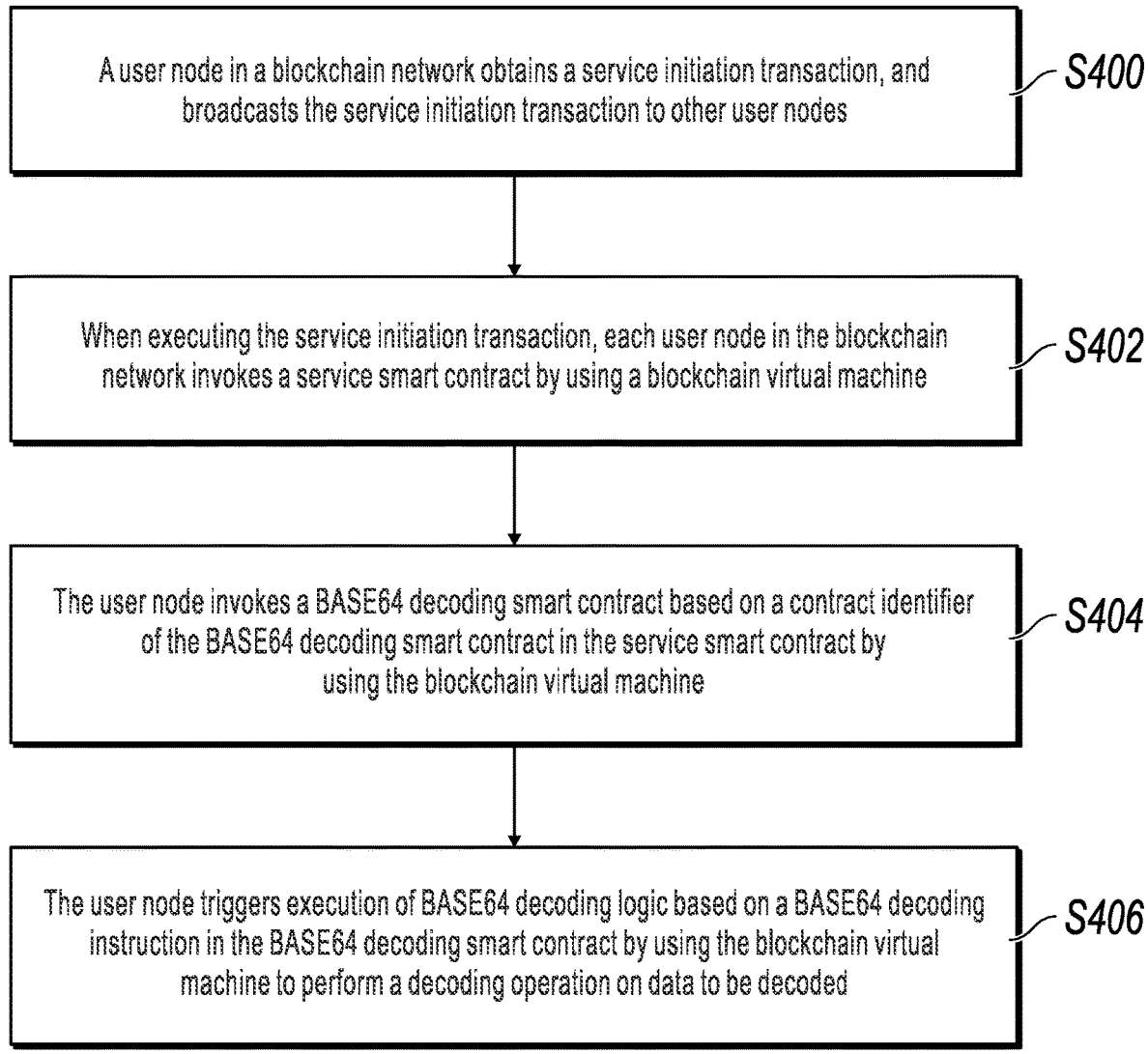
FIG. 4 is a schematic flowchart illustrating another decoding method based on a blockchain smart contract, according to some embodiments of the present specification.

FIG. 4 is a schematic flowchart illustrating another decoding method based on a blockchain smart contract, according to some embodiments of the present specification. The method includes the following steps:

S400: A node in a blockchain network obtains a service initiation transaction, and broadcasts the service initiation transaction to other nodes.

S402: When executing the service initiation transaction, each node in the blockchain network invokes a service smart contract by using a blockchain virtual machine.

S404: The node invokes a BASE64 decoding smart contract based on a contract identifier of the BASE64 decoding smart contract in the service smart contract by using the blockchain virtual machine.

S406: The node triggers execution of BASE64 decoding logic based on a BASE64 decoding instruction in the BASE64 decoding smart contract by using the blockchain virtual machine to perform a decoding operation on data to be decoded.

In some embodiments, the blockchain network needs to be pre-configured, so the following can be implemented:

(1) An instruction set of the blockchain virtual machine includes the BASE64 decoding instruction, and the BASE64 decoding logic corresponding to the BASE64 decoding instruction is deployed in the blockchain virtual machine.

(2) An instruction set of a smart contract compiler includes the BASE64 decoding instruction, the service smart contract compiled by using the smart contract compiler includes the contract identifier of the BASE64 decoding smart contract, and the BASE64 decoding smart contract is a smart contract pre-deployed in the blockchain network.

(3) The service smart contract is deployed in the blockchain network.

A difference between Embodiment 4 and Embodiment 3 mainly lies in the following: In Embodiment 4, after the blockchain virtual machine invokes the service smart contract, when the blockchain virtual machine reads the contract identifier of the BASE64 decoding smart contract, it is equivalent to determining that the BASE64 decoding smart contract needs to be further invoked. The blockchain virtual machine invokes the BASE64 decoding smart contract, and also reads bytecode or binary code in the BASE64 decoding smart contract. When the blockchain virtual machine reads the BASE64 decoding instruction, it is equivalent to determining that a BASE64 decoding operation needs to be performed. Therefore, the blockchain virtual machine triggers execution of the locally pre-deployed BASE64 decoding logic to perform a decoding operation on the data to be decoded.

Figure 5A:
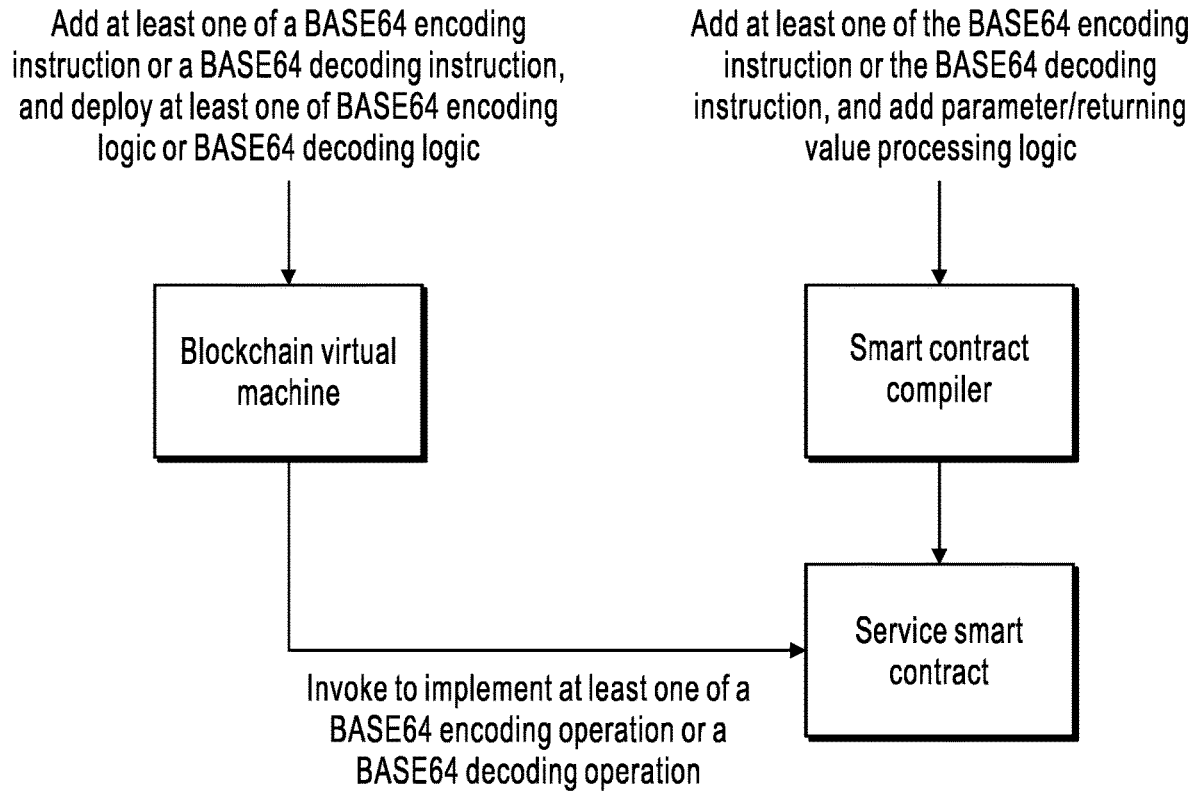
FIG. 5a and FIG. 5b are schematic diagrams illustrating deployment of a BASE64 encoding/decoding operation, according to some embodiments of the present specification.

FIG. 5a is a schematic diagram illustrating deployment of a BASE64 encoding/decoding operation corresponding to Embodiment 1 and Embodiment 3, according to some embodiments of the present specification. As shown in FIG. 5a, first, at least one of the BASE64 encoding instruction or the BASE64 decoding instruction is added to the instruction set of the blockchain virtual machine, and at least one of the BASE64 encoding logic or the BASE64 decoding logic is deployed in the blockchain virtual machine. Second, at least one of the BASE64 encoding instruction or the BASE64 decoding instruction is added to the instruction set of the smart contract compiler. Third, the service smart contract (which includes at least one of the BASE64 encoding instruction or the BASE64 decoding instruction) compiled by using the smart contract compiler is deployed in the blockchain network.

It is worthwhile to note that when a function instruction (which includes the various instructions described in the present specification) is added to the smart contract compiler, processing logic (such as parameter/returning value processing logic) corresponding to the function instruction generally needs to be correspondingly added to the smart contract compiler, so the smart contract compiler also writes the processing logic corresponding to the function instruction into the service smart contract.

Figure 5B:
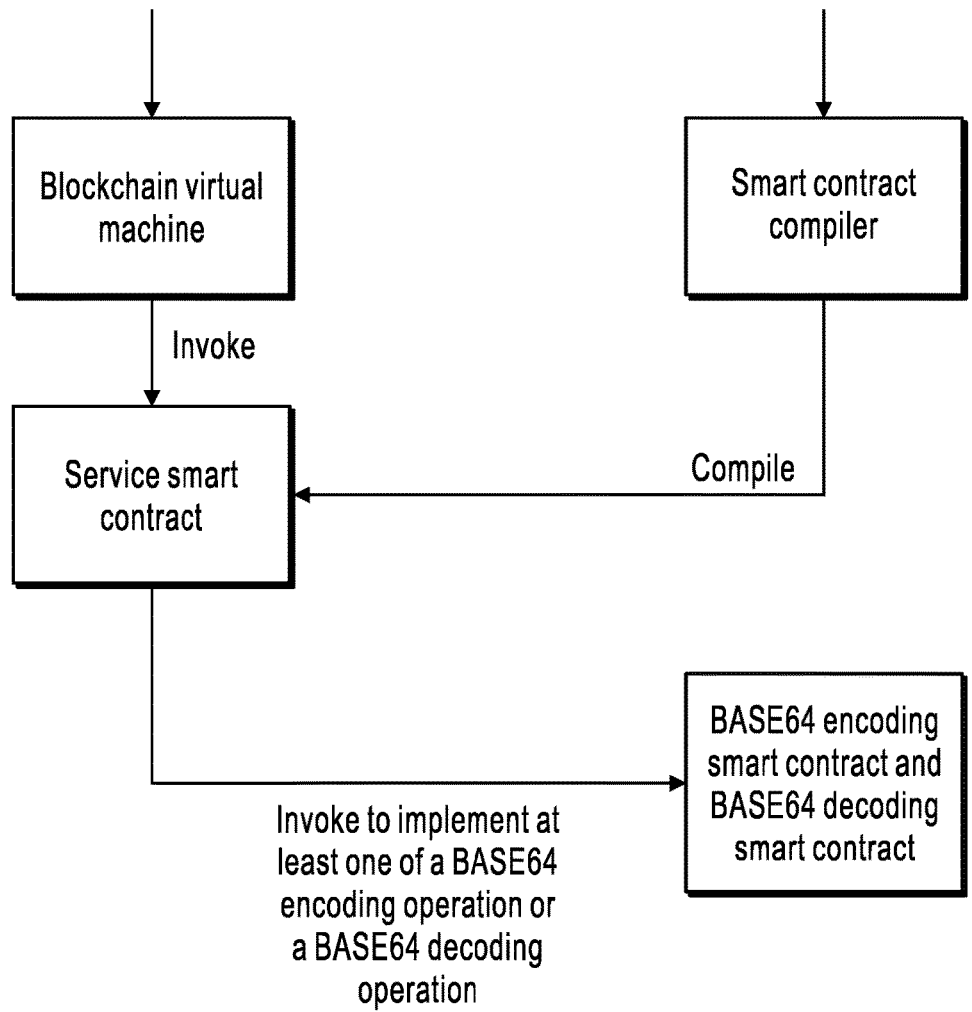

FIG. 5b is a schematic diagram illustrating deployment of a BASE64 encoding/decoding operation corresponding to Embodiment 2 and Embodiment 4, according to some embodiments of the present specification. As shown in FIG. 5b, first, at least one of the BASE64 encoding instruction or the BASE64 decoding instruction is added to the instruction set of the blockchain virtual machine, and at least one of the BASE64 encoding logic or the BASE64 decoding logic is deployed in the blockchain virtual machine. Second, at least one of the BASE64 encoding instruction or the BASE64 decoding instruction is added to the instruction set of the smart contract compiler. Third, the service smart contract (which includes the contract identifier of the BASE64 encoding smart contract and the contract identifier of the BASE64 decoding smart contract) compiled by using the smart contract compiler is deployed in the blockchain network.

Embodiment 5

Figure 6:
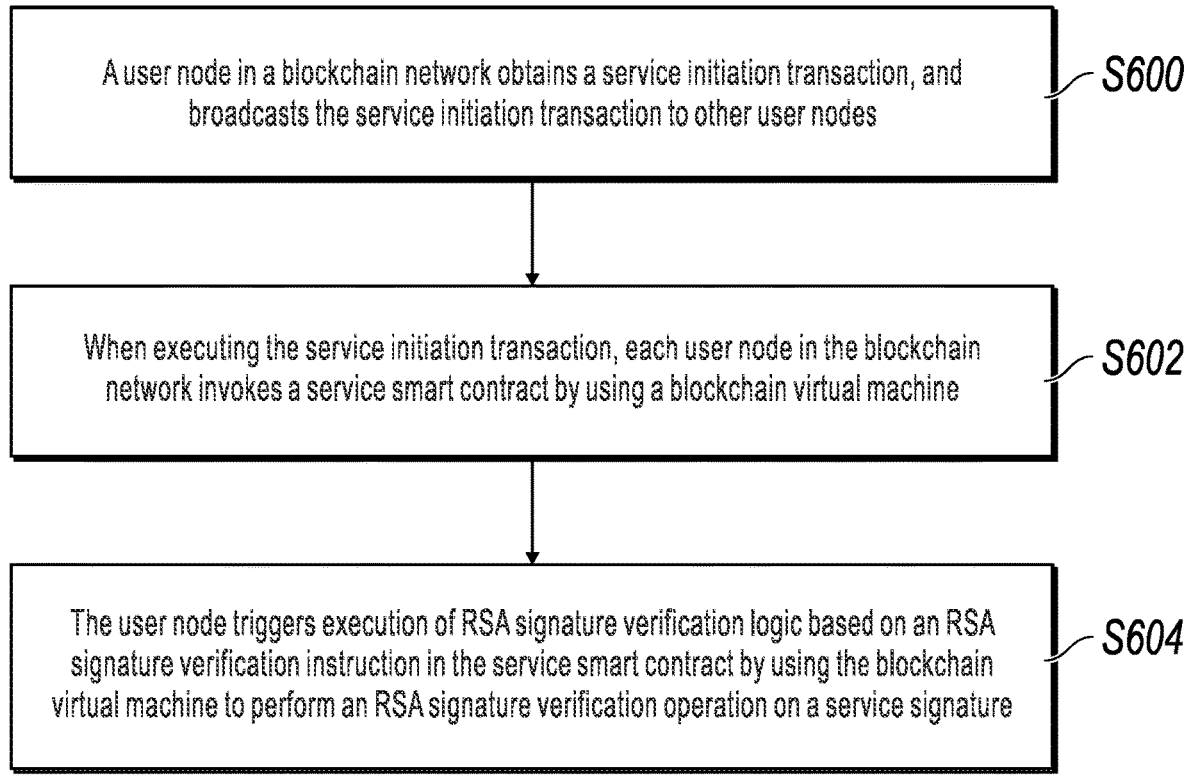
FIG. 6 is a schematic flowchart illustrating a signature verification method based on a blockchain smart contract, according to some embodiments of the present specification.

FIG. 6 is a schematic flowchart illustrating a signature verification method based on a blockchain smart contract, according to some embodiments of the present specification. The method includes the following steps:

S600: A node in a blockchain network obtains a service initiation transaction, and broadcasts the service initiation transaction to other nodes.

S602: When executing the service initiation transaction, each node in the blockchain network invokes a service smart contract by using a blockchain virtual machine.

S604: The node triggers execution of RSA signature verification logic based on an RSA signature verification instruction in the service smart contract by using the blockchain virtual machine to perform an RSA signature verification operation on a service signature.

In some embodiments, the blockchain network needs to be pre-configured, so the following can be implemented:

(1) An instruction set of the blockchain virtual machine includes the RSA signature verification instruction, and the RSA signature verification logic corresponding to the RSA signature verification instruction is deployed in the blockchain virtual machine.

(2) An instruction set of a smart contract compiler includes the RSA signature verification instruction, and the service smart contract compiled by using the smart contract compiler includes the RSA signature verification instruction.

(3) The service smart contract is deployed in the blockchain network.

The service smart contract is a smart contract corresponding to a service that needs to invoke an RSA signature verification function.

In Embodiment 5, after invoking the service smart contract, the blockchain virtual machine reads bytecode or binary code in the service smart contract, and executes the bytecode or the binary code. When the blockchain virtual machine reads the RSA signature verification instruction in the service smart contract, it is equivalent to determining that an RSA signature verification operation needs to be performed. Therefore, the blockchain virtual machine triggers execution of the locally pre-deployed RSA signature verification logic to perform a signature verification operation on the service signature.

In practice, depending on a specific service demand, the following cases exist:

(1) The service initiation transaction includes the service signature, signed data corresponding to the service signature, and a public key used to verify the service signature.

(2) The service initiation transaction includes the service signature, an abstract of signed data corresponding to the service signature, and a public key used to verify the service signature.

(3) The service initiation transaction includes the service signature and signed data corresponding to the service signature, and the service smart contract includes a public key used to verify the service signature.

(4) The service initiation transaction includes the service signature and an abstract of signed data corresponding to the service signature, and the service smart contract includes a public key used to verify the service signature.

It is worthwhile to note that if the blockchain virtual machine triggers execution of the RSA signature verification logic based on the RSA signature verification instruction in the service smart contract, a stack transfer method is usually used in an execution process for data transfer.

In addition, the blockchain virtual machine can also execute the RSA signature verification logic by using a memory transfer method (a pre-compiled contract method), and the method is described in the following Embodiment 6.

Embodiment 6

Figure 7:
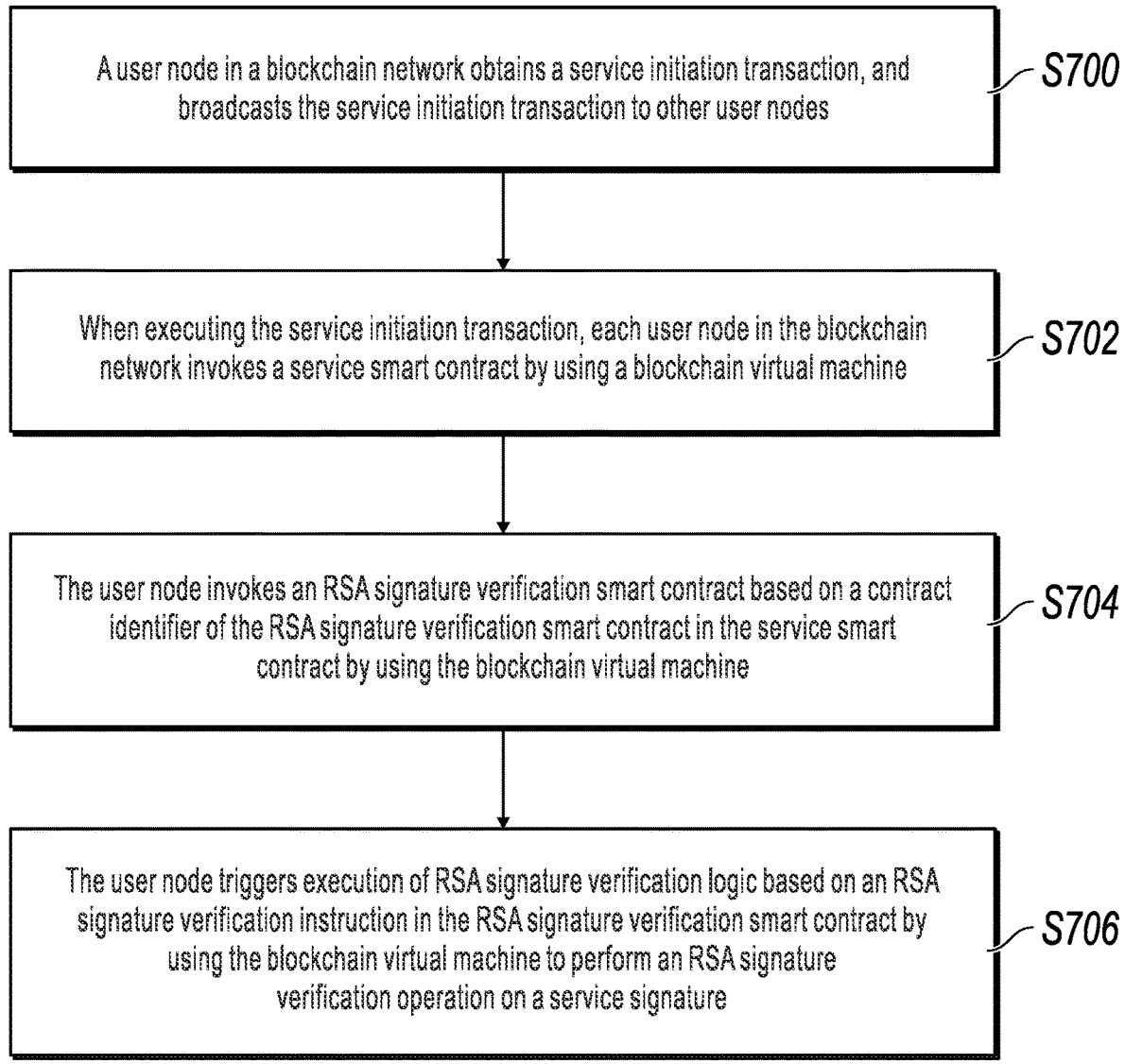
FIG. 7 is a schematic flowchart illustrating another signature verification method based on a blockchain smart contract, according to some embodiments of the present specification.

FIG. 7 is a schematic flowchart illustrating a signature verification method based on a blockchain smart contract, according to some embodiments of the present specification. The method includes the following steps:

S700: A node in a blockchain network obtains a service initiation transaction, and broadcasts the service initiation transaction to other nodes.

S702: When executing the service initiation transaction, each node in the blockchain network invokes a service smart contract by using a blockchain virtual machine.

S704: The node invokes an RSA signature verification smart contract based on a contract identifier of the RSA signature verification smart contract in the service smart contract by using the blockchain virtual machine.

S706: The node triggers execution of RSA signature verification logic based on an RSA signature verification instruction in the RSA signature verification smart contract by using the blockchain virtual machine to perform an RSA signature verification operation on a service signature.

In some embodiments, the blockchain network needs to be pre-configured, so the following can be implemented:

(1) An instruction set of the blockchain virtual machine includes the RSA signature verification instruction, and the RSA signature verification logic corresponding to the RSA signature verification instruction is deployed in the blockchain virtual machine.

(2) An instruction set of the smart contract compiler includes the RSA signature verification instruction, the service smart contract compiled by using the smart contract compiler includes the contract identifier of the RSA signature verification smart contract, and the RSA signature verification smart contract is a smart contract pre-deployed in the blockchain network.

(3) The service smart contract is deployed in the blockchain network.

A difference between Embodiment 6 and Embodiment 5 mainly lies in the following: In Embodiment 6, after the blockchain virtual machine invokes the service smart contract, when the blockchain virtual machine reads the contract identifier of the RSA signature verification smart contract, it is equivalent to determining that the RSA signature verification smart contract needs to be further invoked. The blockchain virtual machine invokes the RSA signature verification smart contract, and also reads bytecode or binary code in the RSA signature verification smart contract. When the blockchain virtual machine reads the RSA signature verification instruction, it is equivalent to determining that an RSA signature verification operation needs to be performed. Therefore, the blockchain virtual machine triggers execution of the locally pre-deployed RSA signature verification logic to perform an RSA signature verification operation on the service signature.

That is, in Embodiment 6, when the smart contract compiler compiles the service smart contract, if the smart contract compiler finds that invoking of the RSA signature verification operation is declared in the service smart contract, the smart contract compiler compiles the declaration into the contract identifier of the RSA signature verification smart contract instead of the RSA signature verification instruction. As such, when invoking the service smart contract, the blockchain virtual machine further invokes the RSA signature verification smart contract.

Figure 8A:
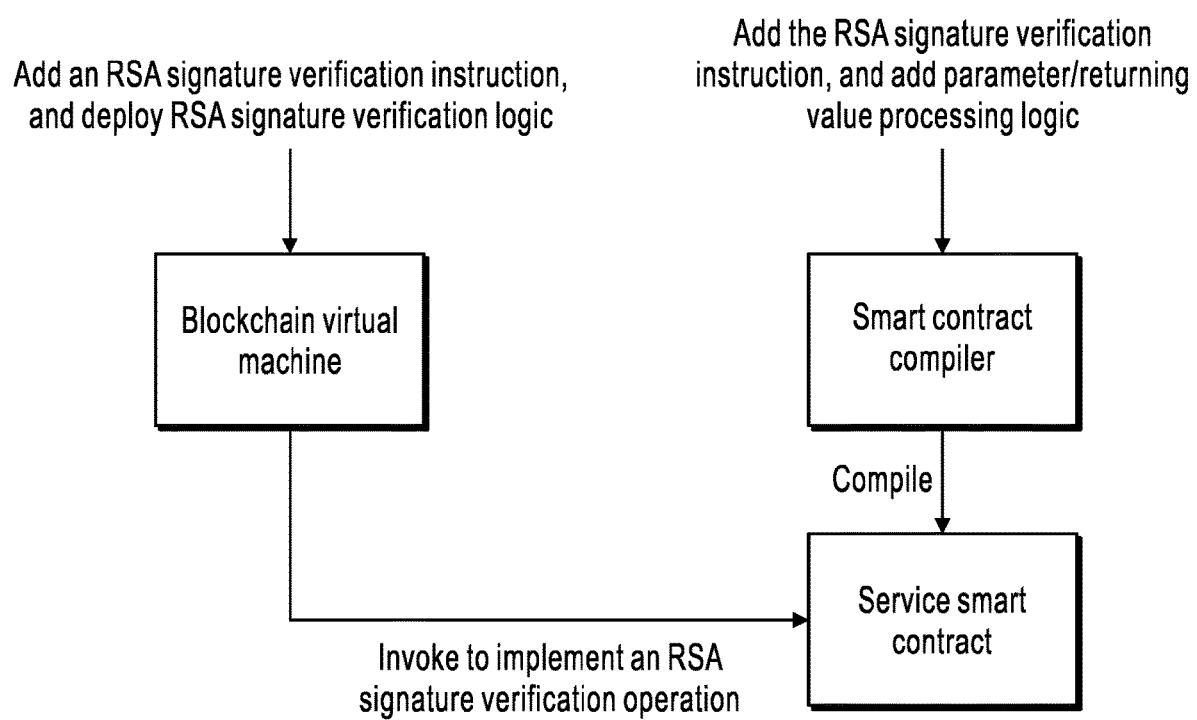
FIG. 8a and FIG. 8b are schematic diagrams illustrating deployment of an Rivest-Shamir-Adleman (RSA) signature verification operation, according to some embodiments of the present specification.

FIG. 8a is a schematic diagram illustrating deployment of an RSA signature verification operation corresponding to Embodiment 5, according to some embodiments of the present specification. As shown in FIG. 8a, first, the RSA signature verification instruction is added to the instruction set of the blockchain virtual machine, and the RSA signature verification logic is deployed in the blockchain virtual machine. Second, the RSA signature verification instruction is added to the instruction set of the smart contract compiler. Third, the service smart contract (which includes the RSA signature verification instruction) compiled by using the smart contract compiler is deployed in the blockchain network.

Figure 8B:
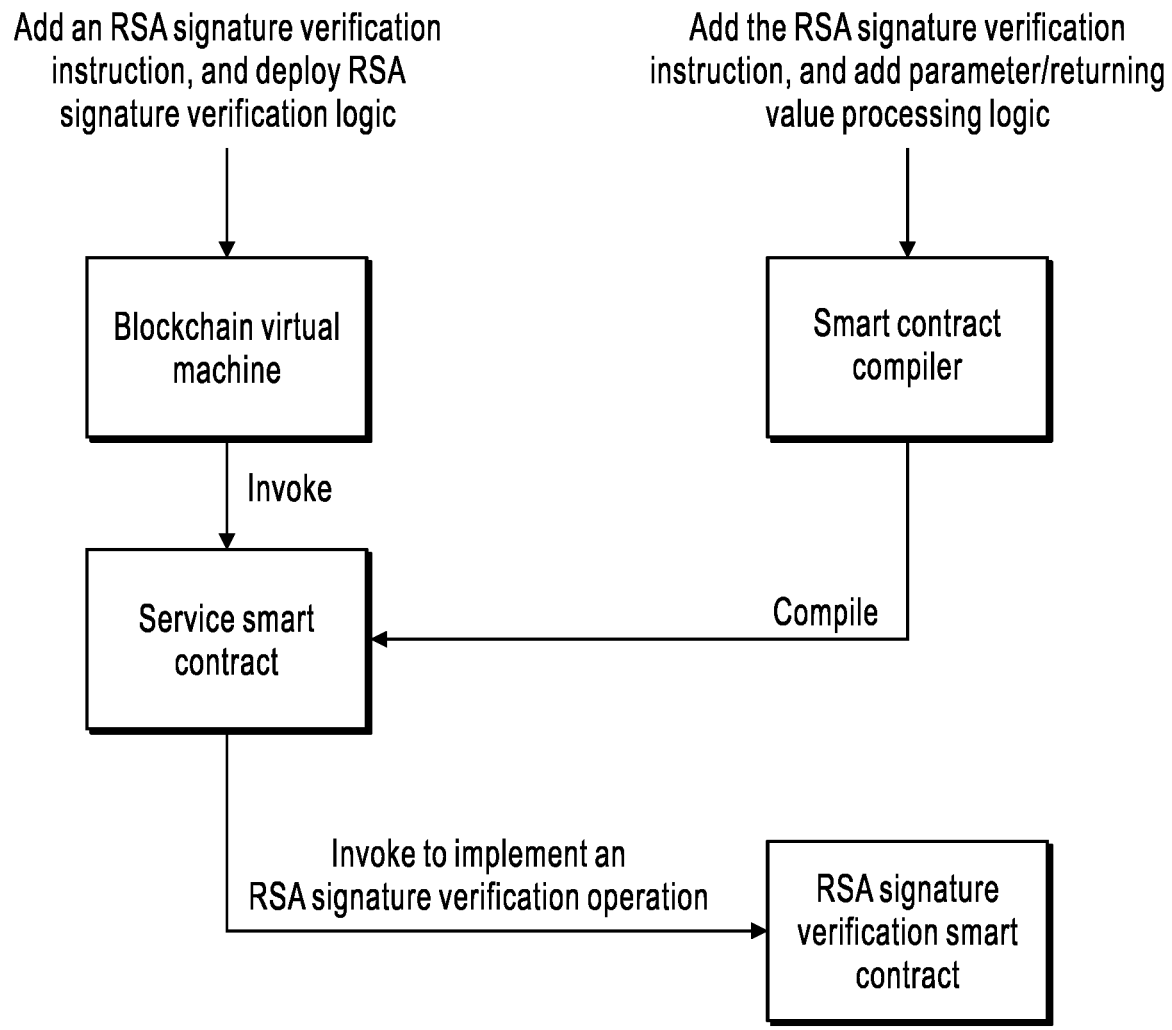

FIG. 8b is a schematic diagram illustrating deployment of an RSA signature verification operation corresponding to Embodiment 6, according to some embodiments of the present specification. As shown in FIG. 8b, first, the RSA signature verification instruction is added to the instruction set of the blockchain virtual machine, and the RSA signature verification logic is deployed in the blockchain virtual machine. Second, the RSA signature verification instruction is added to the instruction set of the smart contract compiler. Third, the service smart contract (which includes the contract identifier of the RSA signature verification smart contract) compiled by using the smart contract compiler is deployed in the blockchain network.

Embodiment 7

Figure 9:
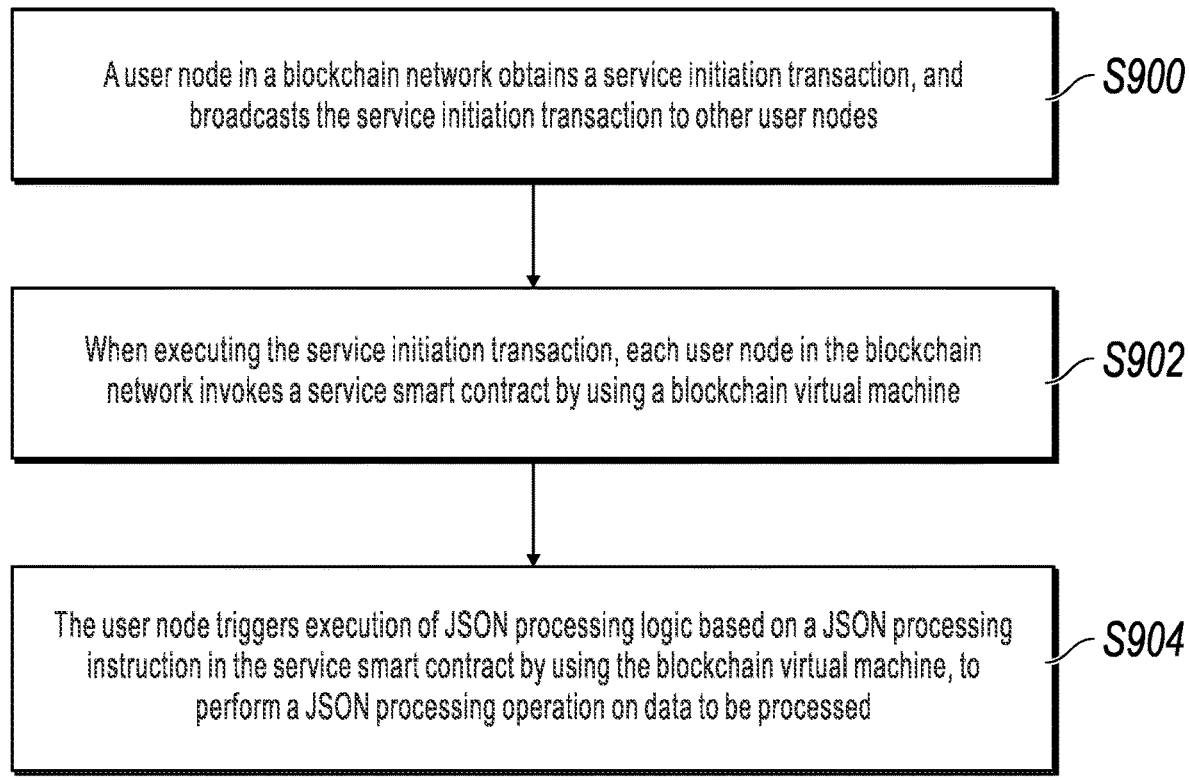
FIG. 9 is a schematic flowchart illustrating a data processing method based on a blockchain smart contract, according to some embodiments of the present specification.

FIG. 9 is a schematic flowchart illustrating a data processing method based on a blockchain smart contract, according to some embodiments of the present specification. The method includes the following steps:

S900: A node in a blockchain network obtains a service initiation transaction, and broadcasts the service initiation transaction to other nodes.

S902: When executing the service initiation transaction, each node in the blockchain network invokes a service smart contract by using a blockchain virtual machine.

S904: The node triggers execution of JSON processing logic based on a JSON processing instruction in the service smart contract by using the blockchain virtual machine to perform a JSON processing operation on data to be processed.

In some embodiments, the blockchain network needs to be pre-configured, so the following can be implemented:

(1) An instruction set of the blockchain virtual machine includes the JSON processing instruction, and the JSON processing logic corresponding to the JSON processing instruction is deployed in the blockchain virtual machine.

(2) An instruction set of a smart contract compiler includes the JSON processing instruction, and the service smart contract compiled by using the smart contract compiler includes the JSON processing instruction.

(3) The service smart contract is deployed in the blockchain network.

The service smart contract is a smart contract corresponding to a service that needs to invoke a JSON processing function. JSON processing specifically includes JSON data parsing and JSON data generation.

In Embodiment 7, after invoking the service smart contract, the blockchain virtual machine reads bytecode or binary code in the service smart contract, and executes the bytecode or the binary code. When the blockchain virtual machine reads the JSON processing instruction in the service smart contract, it is equivalent to determining that a JSON processing operation needs to be performed. Therefore, the blockchain virtual machine triggers execution of the locally pre-deployed JSON processing logic to perform a JSON processing operation on the data to be processed.

In practice, depending on a specific service demand, the data to be processed can be included in the service initiation transaction, can be included in the service smart contract, or can be generated when the blockchain virtual machine executes the service initiation transaction.

In addition, it is worthwhile to note that if the blockchain virtual machine triggers execution of the JSON processing logic based on the JSON processing instruction in the service smart contract, a stack transfer method (that is, data obtained after JSON processing is generally written into a stack) is usually used in an execution process for data transfer. However, a data length of the data obtained after JSON processing is not fixed, and if the stack transfer method is used, implementation is usually relatively complex.

Therefore, the following Embodiment 8 provides another data processing method (a pre-compiled contract method) based on a blockchain smart contract.

Embodiment 8

Figure 10:
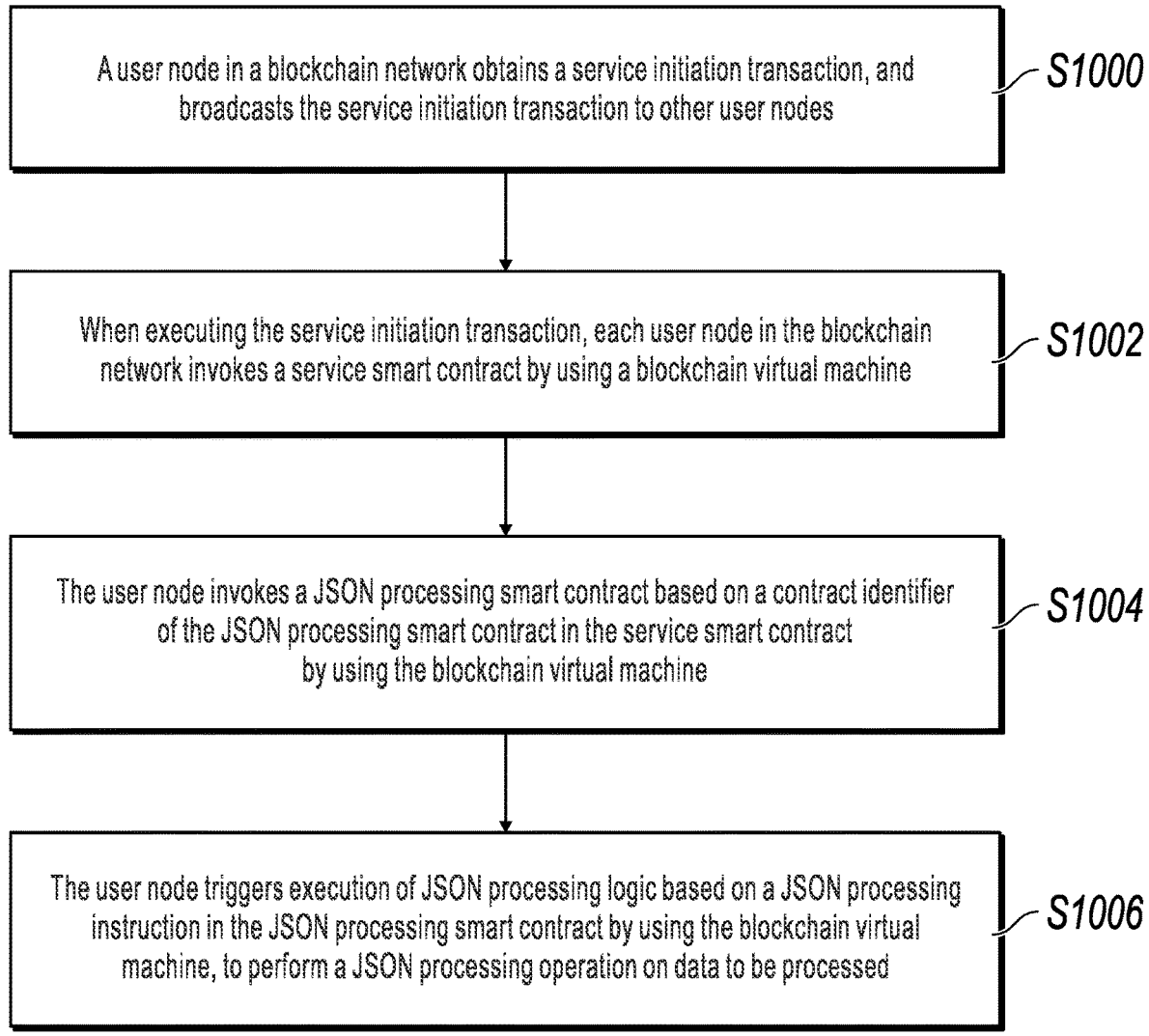
FIG. 10 is a schematic flowchart illustrating a data processing method based on a blockchain smart contract, according to some embodiments of the present specification.

FIG. 10 is a schematic flowchart illustrating a data processing method based on a blockchain smart contract, according to some embodiments of the present specification. The method includes the following steps:

S1000: A node in a blockchain network obtains a service initiation transaction, and broadcasts the service initiation transaction to other nodes.

S1002: When executing the service initiation transaction, each node in the blockchain network invokes a service smart contract by using a blockchain virtual machine.

S1004: The node invokes a JSON processing smart contract based on a contract identifier of the JSON processing smart contract in the service smart contract by using the blockchain virtual machine.

S1006: The node triggers execution of JSON processing logic based on a JSON processing instruction in the JSON processing smart contract by using the blockchain virtual machine to perform a JSON processing operation on data to be processed.

In some embodiments, the blockchain network needs to be pre-configured, so the following can be implemented:

(1) An instruction set of the blockchain virtual machine includes the JSON processing instruction, and the JSON processing logic corresponding to the JSON processing instruction is deployed in the blockchain virtual machine.

(2) An instruction set of a smart contract compiler includes the JSON processing instruction, the service smart contract compiled by using the smart contract compiler includes the contract identifier of the JSON processing smart contract, and the JSON processing smart contract is a smart contract pre-deployed in the blockchain network.

(3) The service smart contract is deployed in the blockchain network.

A difference between Embodiment 8 and Embodiment 7 mainly lies in the following: In Embodiment 8, after the blockchain virtual machine invokes the service smart contract, when the blockchain virtual machine reads the contract identifier of the JSON processing smart contract, it is equivalent to determining that the JSON processing smart contract needs to be further invoked. The blockchain virtual machine invokes the JSON processing smart contract, and also reads bytecode or binary code in the JSON processing smart contract. When the blockchain virtual machine reads the JSON processing instruction, it is equivalent to determining that a JSON processing operation needs to be performed. Therefore, the blockchain virtual machine triggers execution of the locally pre-deployed JSON processing logic to perform a JSON processing operation on the data to be processed.

That is, in Embodiment 8, when the smart contract compiler compiles the service smart contract, if the smart contract compiler finds that invoking of the JSON processing operation is declared in the service smart contract, the smart contract compiler compiles the declaration into the contract identifier of the JSON processing smart contract instead of the JSON processing instruction. As such, when invoking the service smart contract, the blockchain virtual machine further invokes the JSON processing smart contract.

Figure 11A:
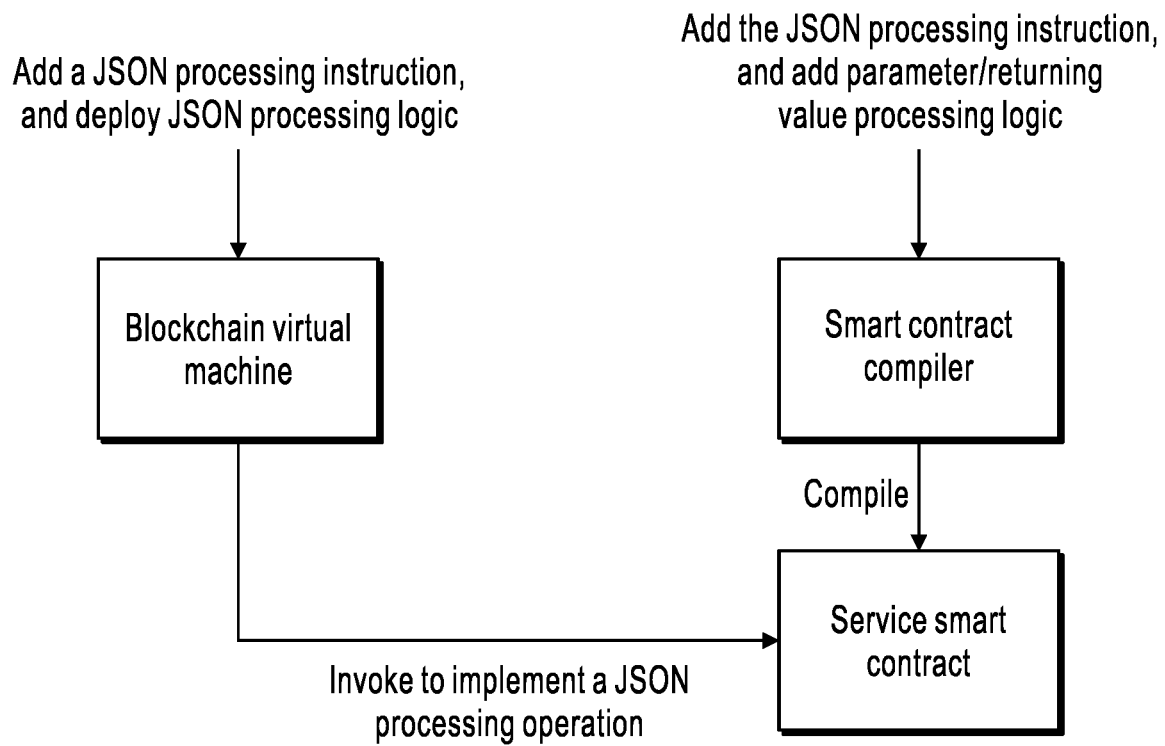
FIG. 11a and FIG. 11b are schematic diagrams illustrating deployment of a Java Script Object Notation (JSON) processing operation, according to some embodiments of the present specification.

FIG. 11a is a schematic diagram illustrating deployment of a JSON processing operation corresponding to Embodiment 7, according to some embodiments of the present specification. As shown in FIG. 11a, first, the JSON processing instruction is added to the instruction set of the blockchain virtual machine, and the JSON processing logic is deployed in the blockchain virtual machine. Second, the JSON processing instruction is added to the instruction set of the smart contract compiler. Third, the service smart contract (which includes the JSON processing instruction) compiled by using the smart contract compiler is deployed in the blockchain network.

Figure 11B:
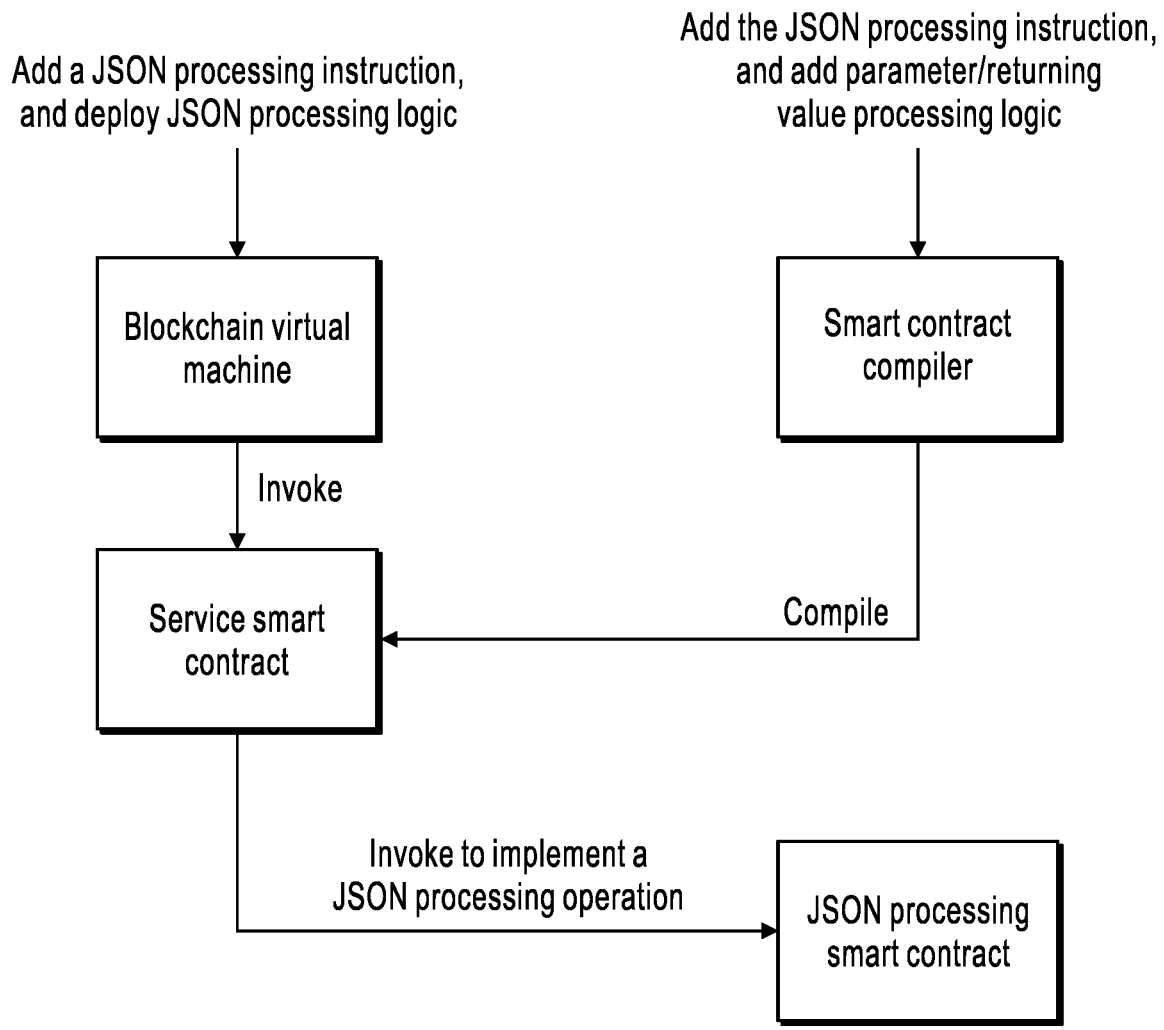

FIG. 11b is a schematic diagram illustrating deployment of a JSON processing operation corresponding to Embodiment 8, according to some embodiments of the present specification. As shown in FIG. 11b, first, the JSON processing instruction is added to the instruction set of the blockchain virtual machine, and the JSON processing logic is deployed in the blockchain virtual machine. Second, the JSON processing instruction is added to the instruction set of the smart contract compiler. Third, the service smart contract (which includes the contract identifier of the JSON processing smart contract) compiled by using the smart contract compiler is deployed in the blockchain network.

Embodiment 9

Figure 12:
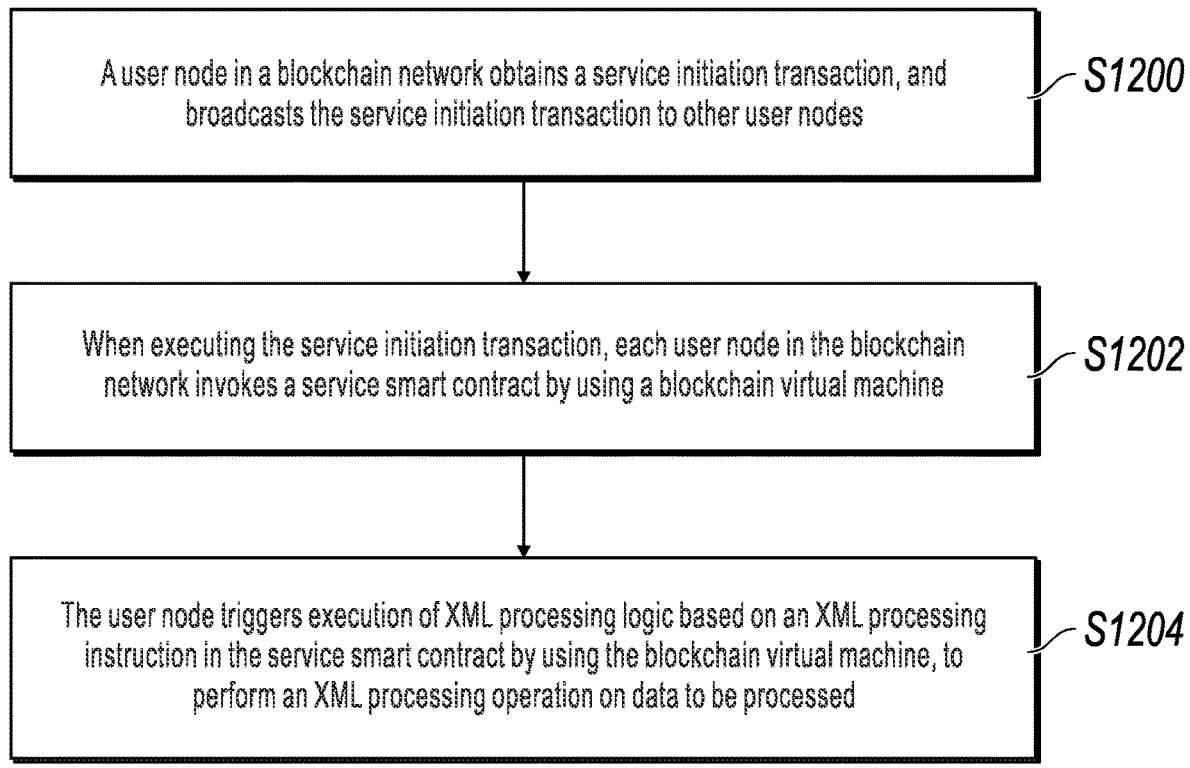
FIG. 12 is a schematic flowchart illustrating a data processing method based on a blockchain smart contract, according to some embodiments of the present specification.

FIG. 12 is a schematic flowchart illustrating a data processing method based on a blockchain smart contract, according to some embodiments of the present specification. The method includes the following steps:

S1200: A node in a blockchain network obtains a service initiation transaction, and broadcasts the service initiation transaction to other nodes.

S1202: When executing the service initiation transaction, each node in the blockchain network invokes a service smart contract by using a blockchain virtual machine.

S1204: The node triggers execution of XML processing logic based on an XML processing instruction in the service smart contract by using the blockchain virtual machine to perform an XML processing operation on data to be processed.

In some embodiments, the blockchain network needs to be pre-configured, so the following can be implemented:

(1) An instruction set of the blockchain virtual machine includes the XML processing instruction, and the XML processing logic corresponding to the XML processing instruction is deployed in the blockchain virtual machine.

(2) An instruction set of a smart contract compiler includes the XML processing instruction, and the service smart contract compiled by using the smart contract compiler includes the XML processing instruction.

(3) The service smart contract is deployed in the blockchain network.

The service smart contract is a smart contract corresponding to a service that needs to invoke an XML processing function. XML processing specifically includes XML data parsing and XML data generation.

In Embodiment 9, after invoking the service smart contract, the blockchain virtual machine reads bytecode or binary code in the service smart contract, and executes the bytecode or the binary code. When the blockchain virtual machine reads the XML processing instruction in the service smart contract, it is equivalent to determining that an XML processing operation needs to be performed. Therefore, the blockchain virtual machine triggers execution of the locally pre-deployed XML processing logic to perform an XML processing operation on the data to be processed.

In practice, depending on a specific service demand, the data to be processed can be included in the service initiation transaction, can be included in the service smart contract, or can be generated when the blockchain virtual machine executes the service initiation transaction.

In addition, it is worthwhile to note that if the blockchain virtual machine triggers execution of the XML processing logic based on the XML processing instruction in the service smart contract, a stack transfer method (that is, data obtained after XML processing is generally written into a stack) is usually used in an execution process for data transfer. However, a data length of the data obtained after XML processing is not fixed, and if the stack transfer method is used, implementation is usually relatively complex.

Therefore, the following Embodiment 10 provides another data processing method (a pre-compiled contract method) based on a blockchain smart contract.

Embodiment 10

Figure 13:
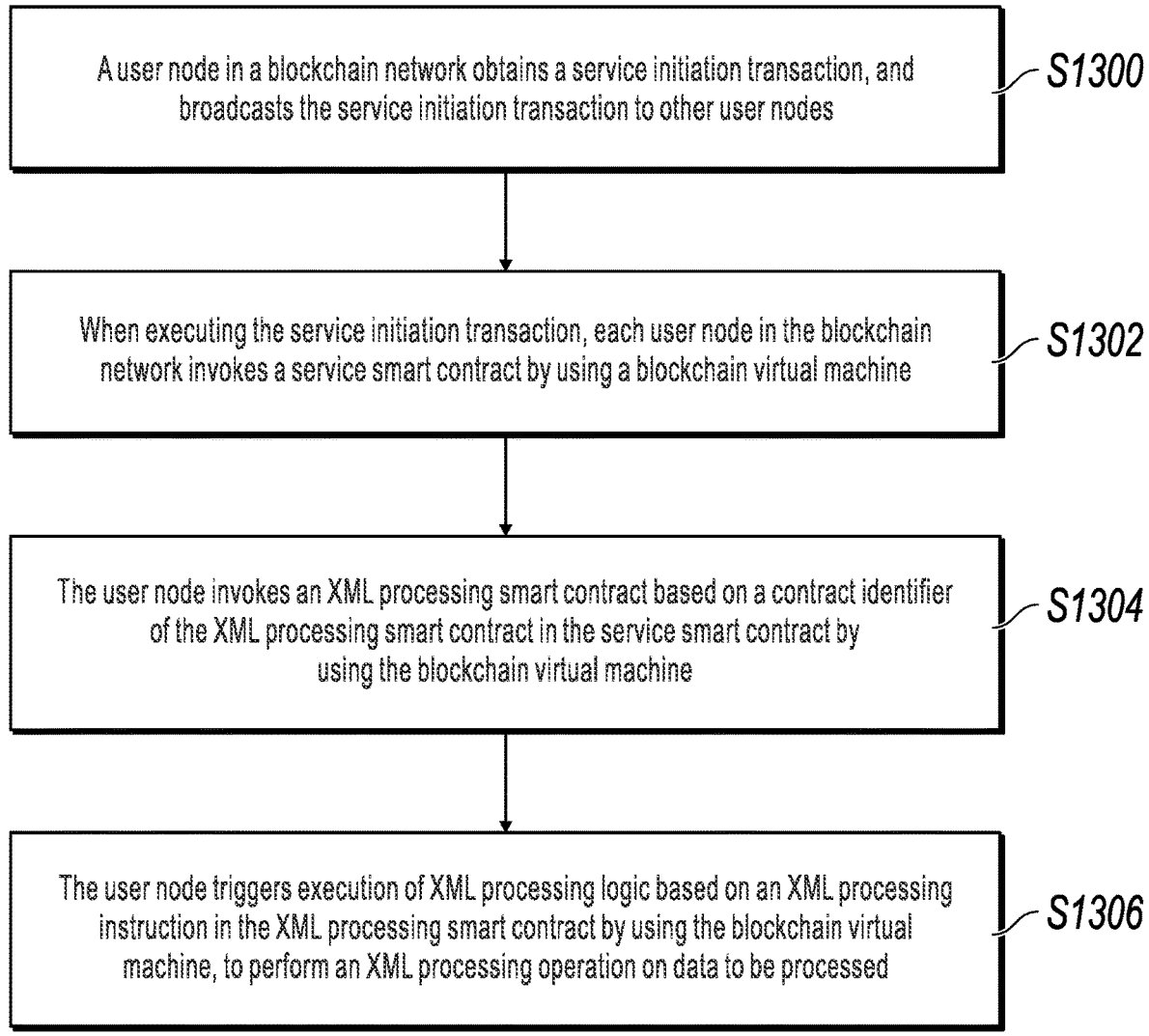
FIG. 13 is a schematic flowchart illustrating a data processing method based on a blockchain smart contract, according to some embodiments of the present specification.

FIG. 13 is a schematic flowchart illustrating a data processing method based on a blockchain smart contract, according to some embodiments of the present specification. The method includes the following steps:

S1300: A node in a blockchain network obtains a service initiation transaction, and broadcasts the service initiation transaction to other nodes.

S1302: When executing the service initiation transaction, each node in the blockchain network invokes a service smart contract by using a blockchain virtual machine.

S1304: The node invokes an XML processing smart contract based on a contract identifier of the XML processing smart contract in the service smart contract by using the blockchain virtual machine.

S1306: The node triggers execution of XML processing logic based on an XML processing instruction in the XML processing smart contract by using the blockchain virtual machine to perform an XML processing operation on data to be processed.

In some embodiments, the blockchain network needs to be pre-configured, so the following can be implemented:

(1) An instruction set of the blockchain virtual machine includes the XML processing instruction, and the XML processing logic corresponding to the XML processing instruction is deployed in the blockchain virtual machine.

(2) An instruction set of a smart contract compiler includes the XML processing instruction, the service smart contract compiled by using the smart contract compiler includes the contract identifier of the XML processing smart contract, and the XML processing smart contract is a smart contract pre-deployed in the blockchain network.

(3) The service smart contract is deployed in the blockchain network.

A difference between Embodiment 10 and Embodiment 9 mainly lies in the following: In Embodiment 10, after the blockchain virtual machine invokes the service smart contract, when the blockchain virtual machine reads the contract identifier of the XML processing smart contract, it is equivalent to determining that the XML processing smart contract needs to be further invoked. The blockchain virtual machine invokes the XML processing smart contract, and also reads bytecode or binary code in the XML processing smart contract. When the blockchain virtual machine reads the XML processing instruction, it is equivalent to determining that an XML processing operation needs to be performed. Therefore, the blockchain virtual machine triggers execution of the locally pre-deployed XML processing logic to perform an XML processing operation on the data to be processed.

That is, in Embodiment 10, when the smart contract compiler compiles the service smart contract, if the smart contract compiler finds that invoking of the XML processing operation is declared in the service smart contract, the smart contract compiler compiles the declaration into the contract identifier of the XML processing smart contract instead of the XML processing instruction. As such, when invoking the service smart contract, the blockchain virtual machine further invokes the XML processing smart contract.

Figure 14A:
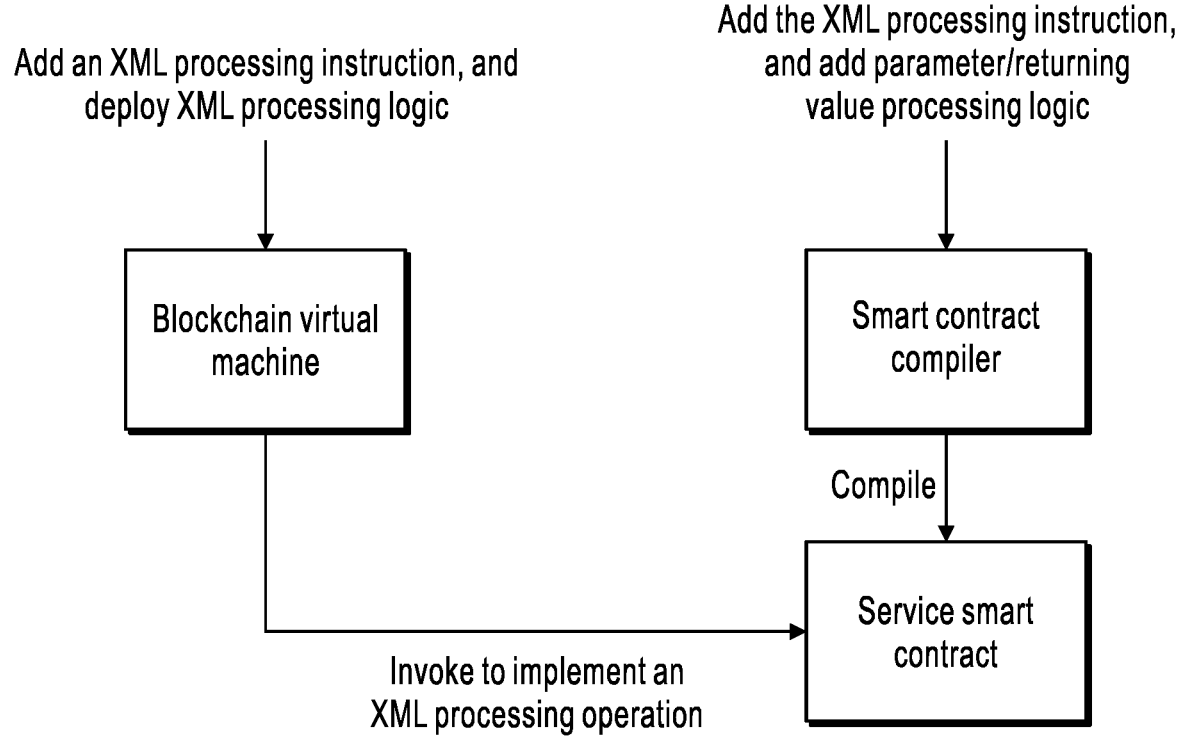
FIG. 14a and FIG. 14b are schematic diagrams illustrating deployment of a processing operation, according to some embodiments of the present specification.

FIG. 14a is a schematic diagram illustrating deployment of an XML processing operation corresponding to Embodiment 9, according to some embodiments of the present specification. As shown in FIG. 14a, first, the XML processing instruction is added to the instruction set of the blockchain virtual machine, and the XML processing logic is deployed in the blockchain virtual machine. Second, the XML processing instruction is added to the instruction set of the smart contract compiler. Third, the service smart contract (which includes the XML processing instruction) compiled by using the smart contract compiler is deployed in the blockchain network.

Figure 14B:
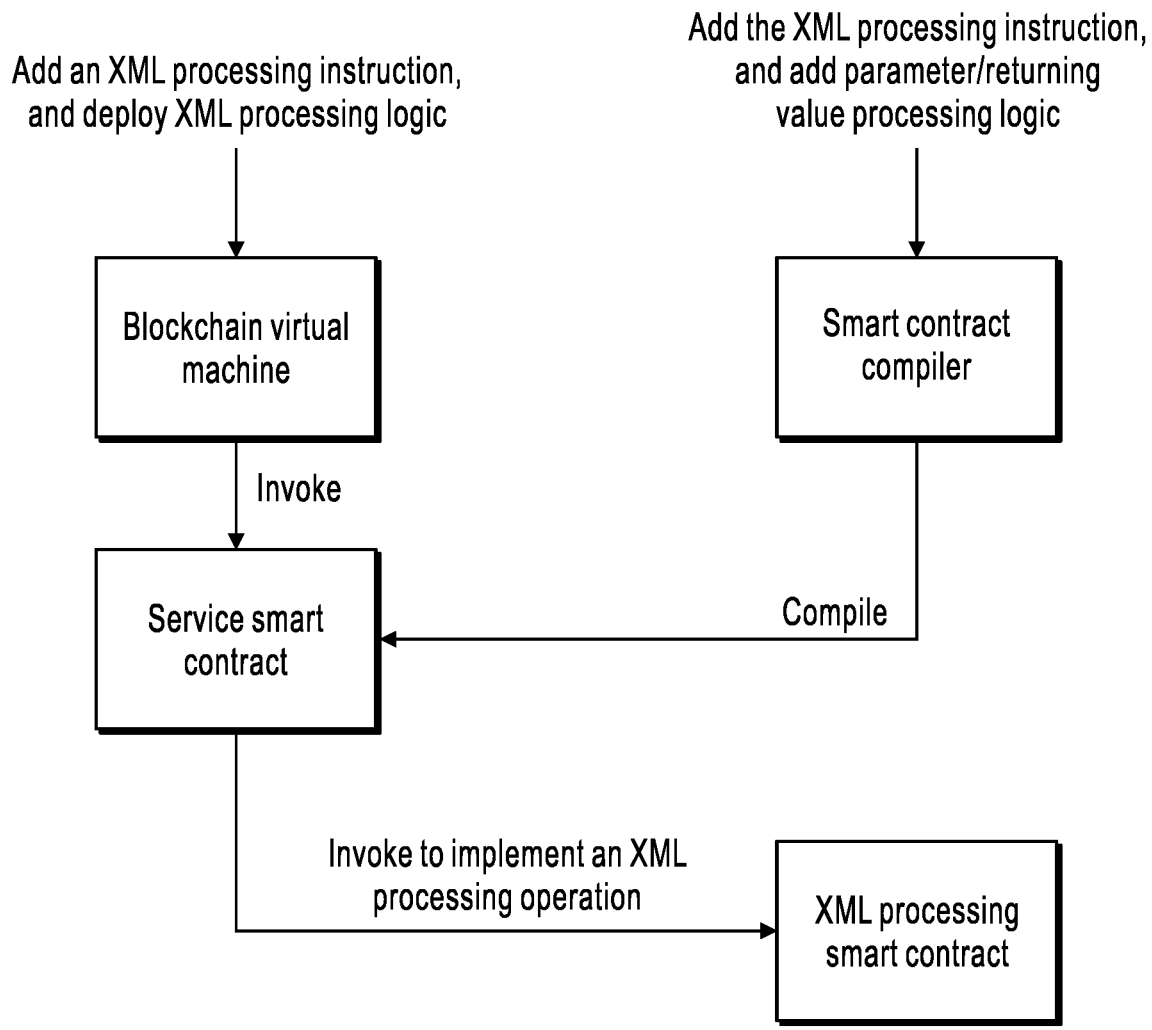

FIG. 14b is a schematic diagram illustrating deployment of an XML processing operation corresponding to Embodiment 10, according to some embodiments of the present specification. As shown in FIG. 14b, first, the XML processing instruction is added to the instruction set of the blockchain virtual machine, and the XML processing logic is deployed in the blockchain virtual machine. Second, the XML processing instruction is added to the instruction set of the smart contract compiler. Third, the service smart contract (which includes the contract identifier of the XML processing smart contract) compiled by using the smart contract compiler is deployed in the blockchain network.

Embodiment 11

Figure 15:
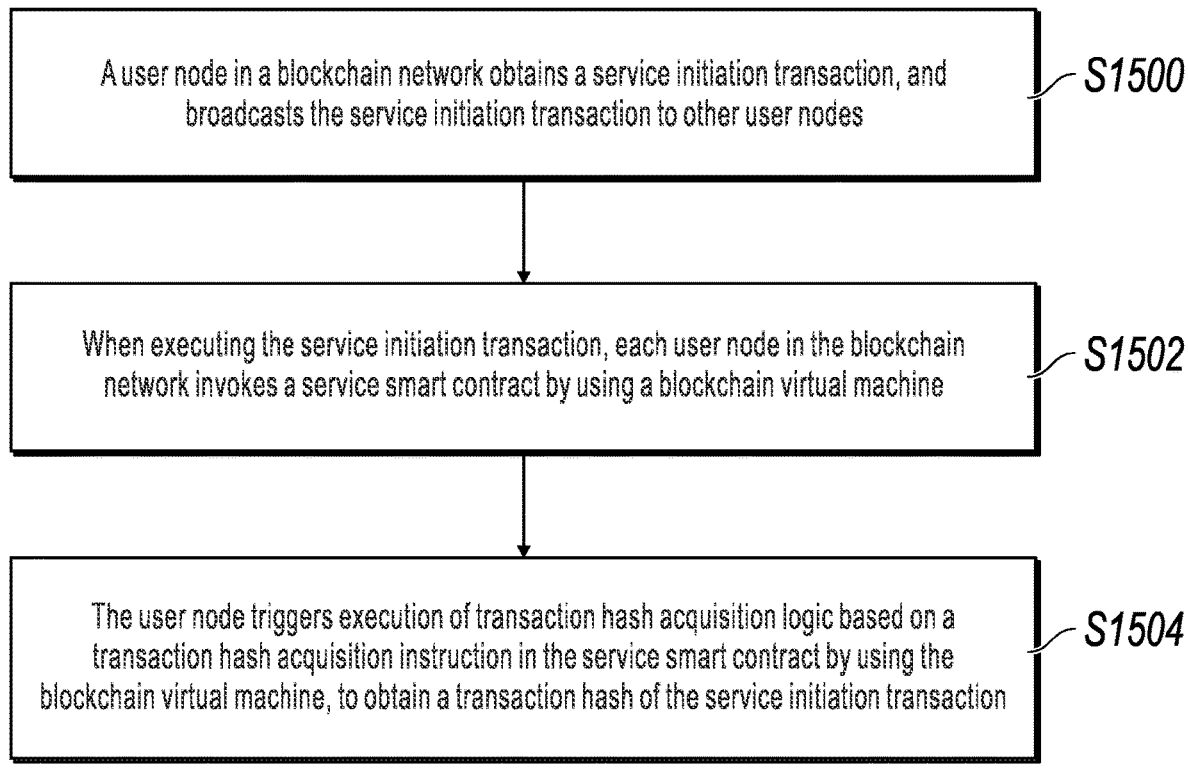
FIG. 15 is a schematic flowchart illustrating a transaction hash acquisition method based on a blockchain smart contract, according to some embodiments of the present specification.

FIG. 15 is a schematic flowchart illustrating a transaction hash acquisition method based on a blockchain smart contract, according to some embodiments of the present specification. The method includes the following steps:

S1500: A node in a blockchain network obtains a service initiation transaction, and broadcasts the service initiation transaction to other nodes.

S1502: When executing the service initiation transaction, each node in the blockchain network invokes a service smart contract by using a blockchain virtual machine.

S1504: The node triggers execution of transaction hash acquisition logic based on a transaction hash acquisition instruction in the service smart contract by using the blockchain virtual machine, to obtain a transaction hash of the service initiation transaction.

In some embodiments, the blockchain network needs to be pre-configured, so the following can be implemented:

(1) An instruction set of the blockchain virtual machine includes a transaction hash acquisition instruction, and transaction hash acquisition logic corresponding to the transaction hash acquisition instruction is deployed in the blockchain virtual machine.

(2) An instruction set of a smart contract compiler includes the transaction hash acquisition instruction, and the service smart contract compiled by using the smart contract compiler includes the transaction hash acquisition instruction.

(3) The service smart contract is deployed in the blockchain network.

The service smart contract is a smart contract corresponding to a service that needs to invoke a transaction hash acquisition function.

In Embodiment 11, after invoking the service smart contract, the blockchain virtual machine reads bytecode or binary code in the service smart contract, and executes the bytecode or the binary code. When the blockchain virtual machine reads the transaction hash acquisition instruction in the service smart contract, it is equivalent to determining that a transaction hash acquisition operation needs to be performed. Therefore, the blockchain virtual machine triggers execution of the locally pre-deployed transaction hash acquisition logic to perform a transaction hash acquisition operation on data to be processed.

In practice, before invoking the service smart contract, each node in the blockchain network initializes a context of the blockchain virtual machine, and writes the transaction hash of the service initiation transaction into the context.

Thus, in step S1504, specifically, the node triggers execution of the transaction hash acquisition logic based on the transaction hash acquisition instruction in the service smart contract by using the blockchain virtual machine, to obtain the transaction hash of the service initiation transaction from the context.

In addition, it is worthwhile to note that if the blockchain virtual machine triggers execution of the transaction hash acquisition logic based on the transaction hash acquisition instruction in the service smart contract, a stack transfer method is generally used in an execution process for data transfer. The following Embodiment 12 provides another transaction hash acquisition method (a pre-compiled contract method) based on a blockchain smart contract.

Embodiment 12

Figure 16:
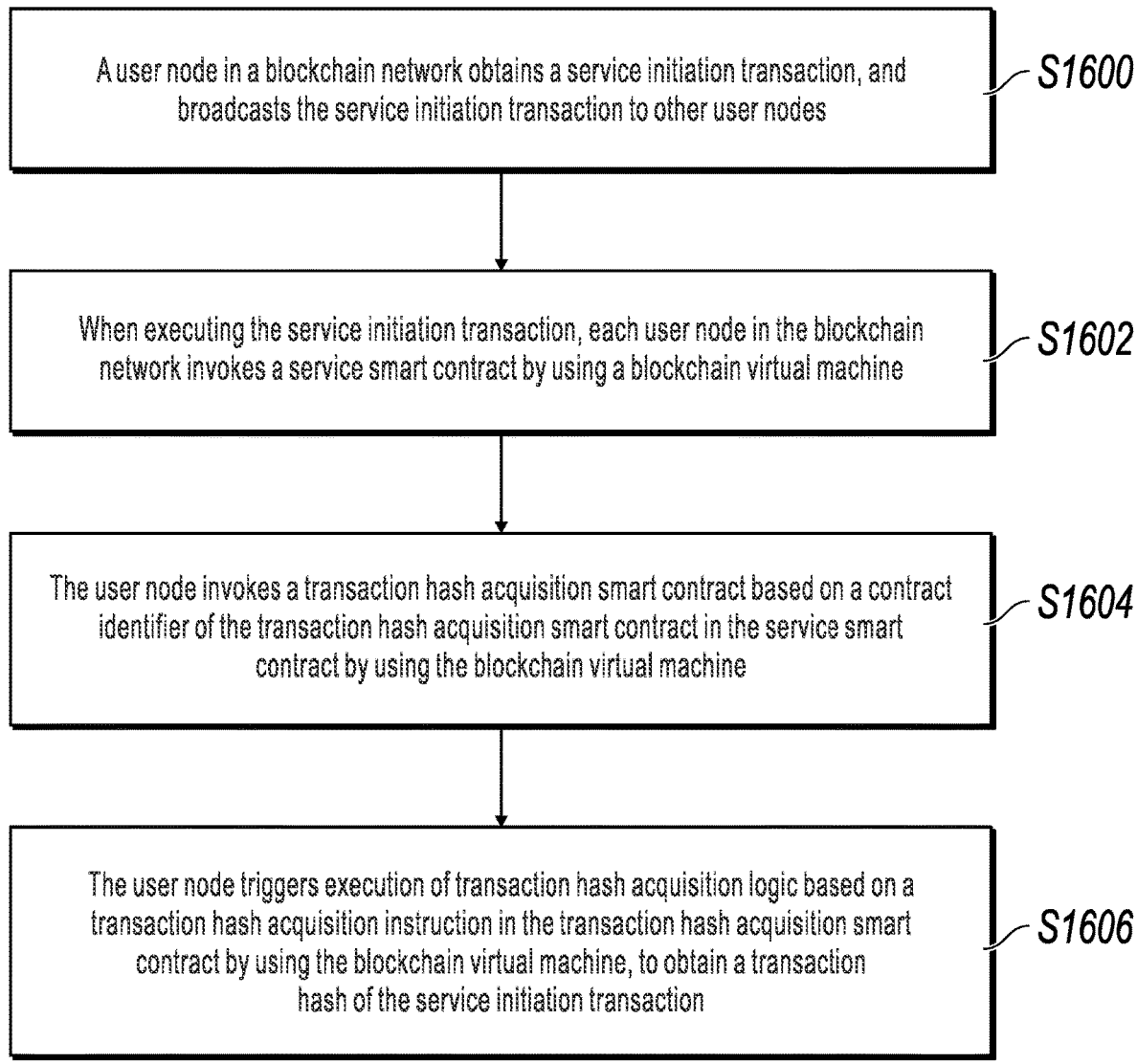
FIG. 16 is a schematic flowchart illustrating a transaction hash acquisition method based on a blockchain smart contract, according to some embodiments of the present specification.

FIG. 16 is a schematic flowchart illustrating a transaction hash acquisition method based on a blockchain smart contract, according to some embodiments of the present specification. The method includes the following steps:

S1600: A node in a blockchain network obtains a service initiation transaction, and broadcasts the service initiation transaction to other nodes.

S1602: When executing the service initiation transaction, each node in the blockchain network invokes a service smart contract by using a blockchain virtual machine.

S1604: The node invokes a transaction hash acquisition smart contract based on a contract identifier of the transaction hash acquisition smart contract in the service smart contract by using the blockchain virtual machine.

S1606: The node triggers execution of transaction hash acquisition logic based on a transaction hash acquisition instruction in the transaction hash acquisition smart contract by using the blockchain virtual machine, to obtain a transaction hash of the service initiation transaction.

In some embodiments, the blockchain network needs to be pre-configured, so the following can be implemented:

(1) An instruction set of the blockchain virtual machine includes a transaction hash acquisition instruction, and transaction hash acquisition logic corresponding to the transaction hash acquisition instruction is deployed in the blockchain virtual machine.

(2) An instruction set of a smart contract compiler includes the transaction hash acquisition instruction, the service smart contract compiled by using the smart contract compiler includes the contract identifier of the transaction hash acquisition smart contract, and the transaction hash acquisition smart contract is a smart contract pre-deployed in the blockchain network.

(3) The service smart contract is deployed in the blockchain network.

A difference between Embodiment 12 and Embodiment 11 mainly lies in the following: In Embodiment 12, after the blockchain virtual machine invokes the service smart contract, when the blockchain virtual machine reads the contract identifier of the transaction hash acquisition smart contract, it is equivalent to determining that the transaction hash acquisition smart contract needs to be further invoked. The blockchain virtual machine invokes the transaction hash acquisition smart contract, and also reads bytecode or binary code in the transaction hash acquisition smart contract. When the blockchain virtual machine reads the transaction hash acquisition instruction, it is equivalent to determining that a transaction hash acquisition operation needs to be performed. Therefore, the blockchain virtual machine triggers execution of the locally pre-deployed transaction hash acquisition logic, to obtain the transaction hash of the service initiation transaction.

That is, in Embodiment 12, when the smart contract compiler compiles the service smart contract, if the smart contract compiler finds that invoking of the transaction hash acquisition operation is declared in the service smart contract, the smart contract compiler compiles the declaration into the contract identifier of the transaction hash acquisition smart contract instead of the transaction hash acquisition instruction. As such, when invoking the service smart contract, the blockchain virtual machine further invokes the transaction hash acquisition smart contract.

In practice, before invoking the service smart contract, each node in the blockchain network initializes a context of the blockchain virtual machine, and writes the transaction hash of the service initiation transaction into the context.

Thus, in step S1606, specifically, the node triggers execution of the transaction hash acquisition logic based on transaction hash acquisition instruction in the transaction hash acquisition smart contract by using the blockchain virtual machine, to obtain the transaction hash of the service initiation transaction from the context.

Figure 17A:
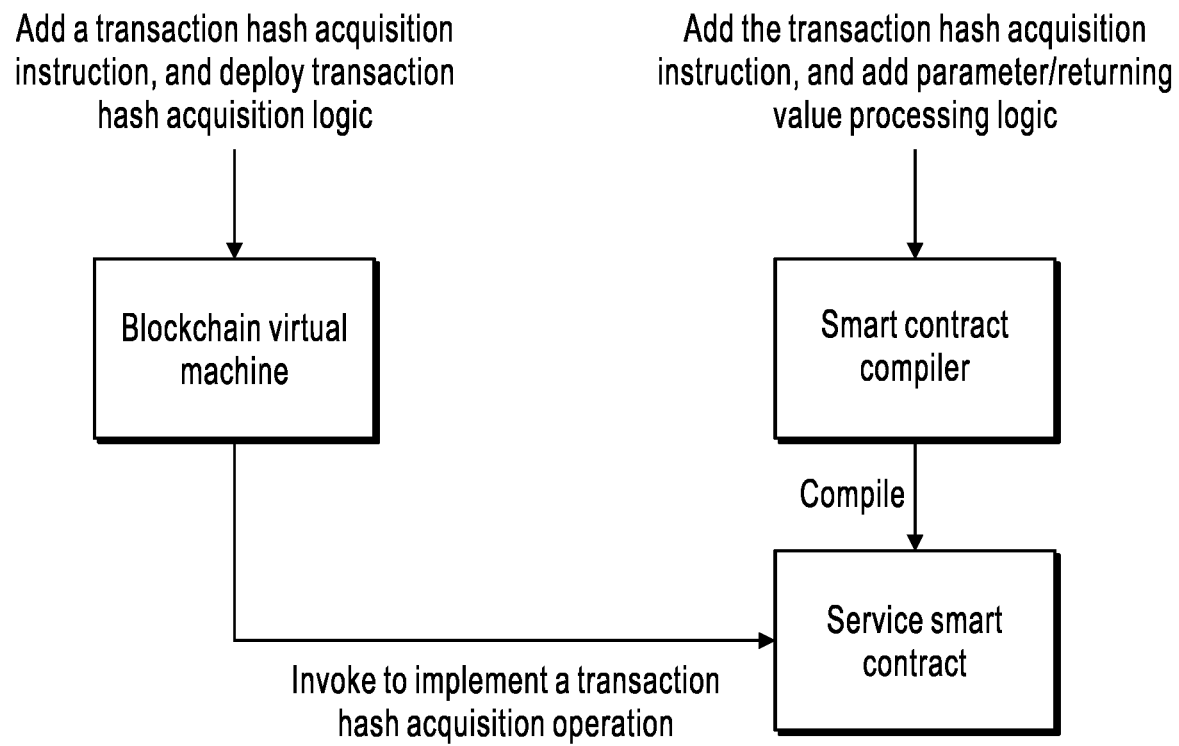
FIG. 17a and FIG. 17b are schematic diagrams illustrating deployment of a transaction hash acquisition operation, according to some embodiments of the present specification.

FIG. 17a is a schematic diagram illustrating deployment of a transaction hash acquisition operation corresponding to Embodiment 11, according to some embodiments of the present specification. As shown in FIG. 17a, first, the transaction hash acquisition instruction is added to the instruction set of the blockchain virtual machine, and the transaction hash acquisition logic is deployed in the blockchain virtual machine. Second, the transaction hash acquisition instruction is added to the instruction set of the smart contract compiler. Third, the service smart contract (which includes the transaction hash acquisition instruction) compiled by using the smart contract compiler is deployed in the blockchain network.

Figure 17B:
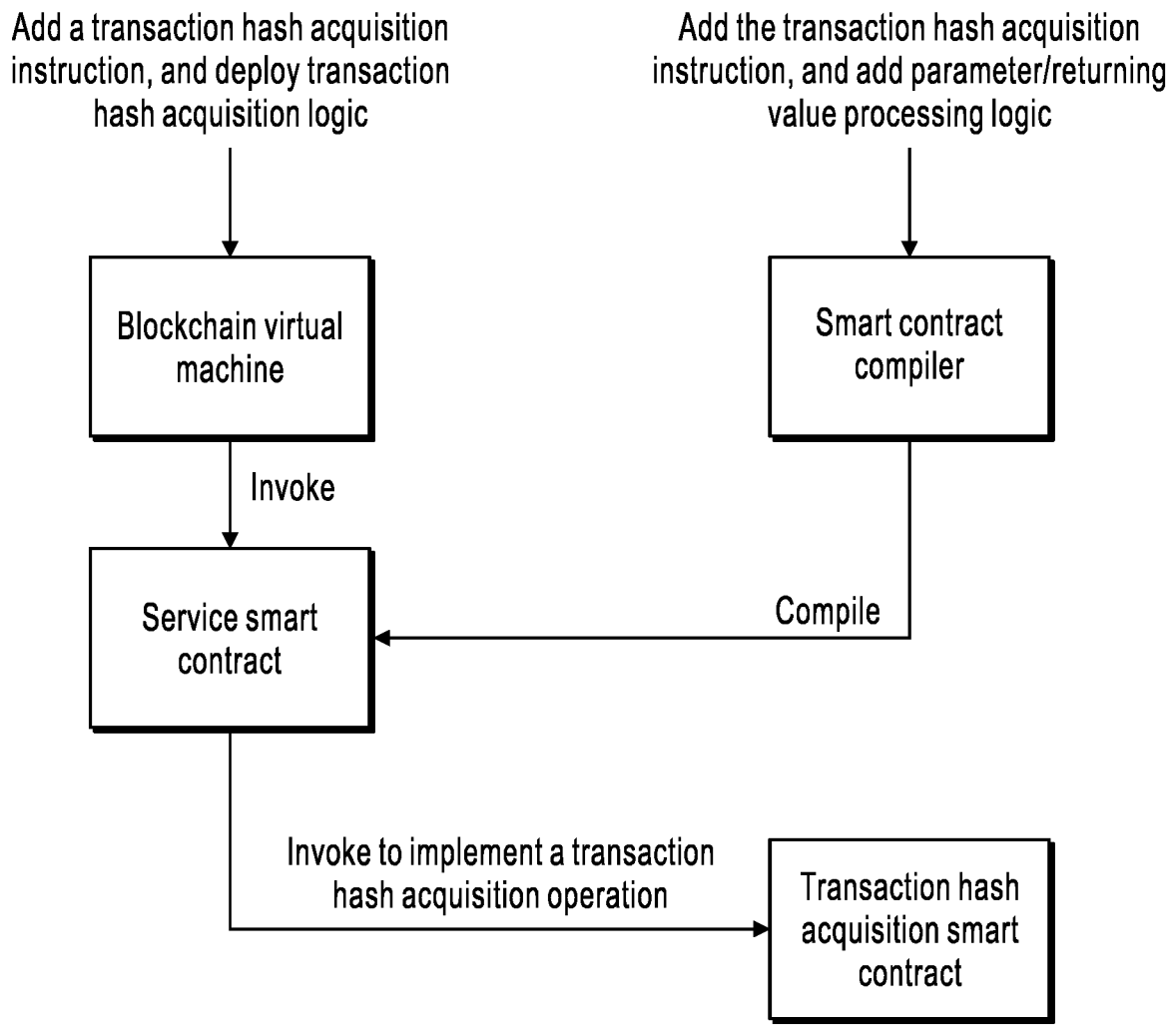

FIG. 17b is a schematic diagram illustrating deployment of a transaction hash acquisition operation corresponding to Embodiment 12, according to some embodiments of the present specification. As shown in FIG. 17b, first, the transaction hash acquisition instruction is added to the instruction set of the blockchain virtual machine, and the transaction hash acquisition logic is deployed in the blockchain virtual machine. Second, the transaction hash acquisition instruction is added to the instruction set of the smart contract compiler. Third, the service smart contract (which includes the contract identifier of the transaction hash acquisition smart contract) compiled by using the smart contract compiler is deployed in the blockchain network.

Embodiment 13

Figure 18:
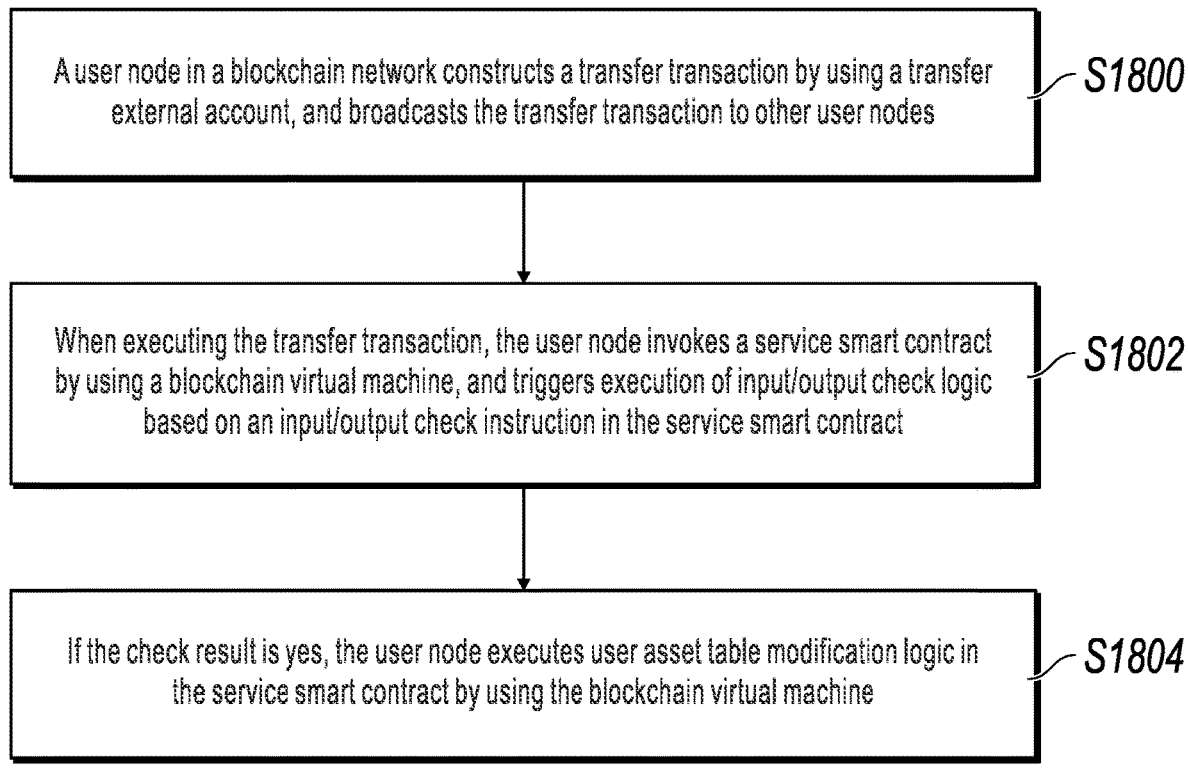
FIG. 18 is a schematic flowchart illustrating a transfer method based on a blockchain smart contract, according to some embodiments of the present specification.

FIG. 18 is a schematic flowchart illustrating a transfer method based on a blockchain smart contract, according to some embodiments of the present specification. The method includes the following steps:

S1800: A node in a blockchain network obtains a transfer transaction by using an external transfer account, and broadcasts the transfer transaction to other nodes.

That is, the node receives the transfer transaction constructed and sent by a client device (which logs in to the external transfer account).

S1802: When executing the transfer transaction, each node in the blockchain network invokes a service smart contract by using a blockchain virtual machine, and triggers execution of input/output check logic based on an input/output check instruction in the service smart contract.

S1804: If the check result is yes, the node executes user asset table modification logic in the service smart contract by using the blockchain virtual machine.

In an Ethereum architecture, external accounts are in a one-to-one correspondence with users. A transfer behavior between two users is actually a transfer behavior between two external accounts.

Assume that external account A expects to transfer money to external account B. External account A first constructs a transfer transaction that includes a transfer amount and an account address of external account B, and then the transfer transaction is broadcast to each node in the blockchain network. After successfully verifying the transfer transaction, each node executes the transfer transaction, and writes the transfer amount into external account B.

It is worthwhile to note that a verification event of each node for the transfer transaction generally includes verifying whether balance of external account A is sufficient, that is, whether the balance of external account A is greater than or equal to the transfer amount. If yes, the verification succeeds. It means that in the existing Ethereum architecture, if money needs to be transferred, account balance of a transferor and a transfer amount are exposed to each node in the blockchain network.

In Embodiment 13, a service demand is actually provided, that is, for a transfer transaction between nodes in the blockchain network, whether asset balance of a transfer user is sufficient to cover a transfer amount is determined without exposing the asset balance of the transfer user and the transfer amount.

To satisfy the service demand, anew transfer model is used in the present application. Instead of using the balance in the external account in the blockchain network for transfer and collection, a service smart contract is created, and an asset system of a user is re-established in the service smart contract. In the asset system, there is no longer a concept of the asset balance. An asset owned by each user is equivalent to a virtual object. The user spends an asset, and the asset disappears.

Specifically, the service smart contract is deployed in the blockchain network, the service smart contract corresponds to a user asset table, and the user asset table is used to record an asset corresponding to each external account (external accounts are in a one-to-one correspondence with users). Any asset is data that includes an encrypted amount, and the encrypted amount is obtained after an amount of the asset is encrypted.

The following Table 3 provides an example of the user asset table.

TABLE 3

| External account 1 | Asset 1, and asset 2 |
| External account 2 | Asset 3, asset 4, and asset 5 |
| External account 3 | Asset 6 |

For example, external account 1 transfers 120 yuan to external account 2. Assume that an amount of asset 1 is 100 yuan and an amount of asset 2 is 50 yuan. External account 1 needs to spend asset 1 and asset 2, and then asset 1 and assert 2 disappear. As such, asset 7 (an amount of 120 yuan) and asset 8 (an amount of 30 yuan) are generated, external account 1 obtains asset 8, and external account 2 obtains asset 7. It can be understood that asset 1+asset 2 is actually input of the transfer, and asset 7+asset 8 is actually output of the transfer. After the transfer, Table 3 is updated to Table 4 shown below.

TABLE 4

| | |
|---|---|
| External account 1 | Asset 8 |
| External account 2 | Asset 3, asset 4, asset 5, and asset 7 |
| External account 3 | Asset 6 |

Therefore, in the present application, for a transfer transaction, a problem of verifying the balance is converted into a problem of verifying whether balance is kept between the input and the output. Because an amount of each asset is actually encrypted and is not exposed to the blockchain virtual machine, it means that when executing a transfer transaction, the blockchain virtual machine needs to check whether an input asset is equal to an output asset by using a homomorphic encryption algorithm (such as the Pedersen commitment algorithm). If the check result is yes, it means that the transfer transaction is feasible (which is equivalent to indicating that balance of a transferor is sufficient).

For a specific implementation, in Embodiment 13, the blockchain network needs to be pre-configured, so the following can be implemented:

(1) An instruction set of the blockchain virtual machine includes the input/output check instruction, and the input/output check logic corresponding to the input/output check instruction is deployed in the blockchain virtual machine.

The input/output check logic includes: checking, by using the homomorphic encryption algorithm for any transfer transaction, whether the sum of an amount of a transfer asset specified in the transfer transaction and an amount of a change asset specified in the transfer transaction is equal to the sum of amounts of expense assets specified in the transfer transaction.

It is further worthwhile to note that the transfer transaction is actually the previous service initiation transaction, but a service here is specifically an encrypted transfer service.

(2) An instruction set of a smart contract compiler includes the input/output check instruction, and the service smart contract compiled by using the smart contract compiler includes the input/output check instruction.

(3) The service smart contract is deployed in the blockchain network.

The service smart contract is a smart contract with a transfer function for hiding the transfer amount and the asset balance.

In step S1800, the node is actually a node corresponding to a transfer user. The external transfer account is actually an external account controlled by the transfer user.

That the node obtains the transfer transaction by using the external transfer account is actually that the transfer user logs in to the client device (or "wallet"), constructs the transfer transaction, and sends the transfer transaction to other nodes.

The transfer transaction includes a transfer asset, a change asset, and at least one expense asset. The at least one expense asset is actually an asset that is input into the transfer, and the transfer asset and the change asset are actually assets that are output from the transfer.

In Embodiment 13, after invoking the service smart contract, the blockchain virtual machine reads bytecode or binary code in the service smart contract, and executes the bytecode or the binary code. When the blockchain virtual machine reads the input/output check instruction in the service smart contract, it is equivalent to determining that an input/output check operation needs to be performed. Therefore, the blockchain virtual machine triggers execution of the locally pre-deployed input/output check logic, to check, by using the homomorphic encryption algorithm, whether the sum of the amount of the transfer asset and the amount of the change asset is equal to the sum of the amounts of the expense assets.

If the check result is yes, it indicates that the transfer transaction is feasible. Thus, the blockchain virtual machine needs to execute the transfer transaction, that is, modify the user asset table based on the transfer transaction. The user asset table modification logic for modifying the user asset table is actually written into the service smart contract in advance. The user asset table modification logic is to release a correspondence between the external transfer account and each expense asset, establish a correspondence between the external transfer account and the change asset, and establish a correspondence between an external collection account and the transfer asset.

In addition, in practice, the following cases may occur: When initiating a transfer transaction, some malicious users set an actual amount of a transfer asset included in the transfer transaction to a negative value, and steal an asset of another person by using a transfer method; and when initiating a transfer transaction, a user performs an unintended operation to set an actual amount of a change asset included in the transfer transaction to a negative value, and consequently, an amount of an asset that is actually transferred by the user is greater than an amount of a transfer asset. To prevent the previous cases from occurring, a zero-knowledge proof method can be used, so when both the actual amount of the transfer asset and the actual amount of the change asset are invisible, it is checked whether both the actual amount of the transfer asset and the actual amount of the change asset fall into a specified value range, such as (0, $2^{64}$]. If the check result is yes, the possibility that the previous cases occur is ruled out.

Specifically, in Embodiment 13, the blockchain network can be further pre-configured, so the following can be implemented:

(4) The instruction set of the blockchain virtual machine further includes an amount check instruction, and amount check logic corresponding to the amount check instruction is further deployed in the blockchain virtual machine.

(5) The instruction set of the smart contract compiler further includes the amount check instruction, and the service smart contract compiled by using the smart contract compiler further includes the amount check instruction.

Based on this, the transfer transaction initiated by the user further needs to include proof-related data (such as Bullet Proof or a Borromean ring signature) used to implement zero-knowledge proof.

When reading the amount check instruction in the service smart contract, the blockchain virtual machine triggers execution of the locally pre-deployed amount check logic, that is, checks, based on the proof-related data, whether both the amount of the transfer asset and the amount of the change asset fall into the specified value range.

In addition, in Embodiment 13, the service smart contract can further include an expense asset check logic, so when executing the service smart contract, the blockchain virtual machine can further check, based on the user asset table, whether assets corresponding to the external transfer account include the expense assets. If the check result is yes, it indicates that an expense asset to be used by the transfer user is an asset owned by the transfer user.

In addition, a data structure of any asset can further include a first status parameter that represents the asset that has been spent or is not spent. The service smart contract can further include first status parameter-related logic, so when executing the service smart contract, the blockchain virtual machine checks, for each expense asset in the transfer transaction based on a first status parameter included in the expense asset, whether the expense asset is not spent. In addition, the first status parameter-related logic further includes: if all final check results for the transfer transaction are yes, modifying the first status parameter included in the expense asset, so the modified first status parameter represents that the expense asset has been spent. If any result in all the final check results for the transfer transaction is no, the transfer transaction will fail, no expense asset is spent, and therefore, there is no need to modify the first status parameter.

Further, a data structure of any asset can further include a second status parameter that represents that the asset exists or does not exist. The service smart contract can further include second status parameter-related logic, so when executing the service smart contract, the blockchain virtual machine checks, for each expense asset in the transfer transaction based on the second status parameter included in the expense asset, whether the expense asset exists. As such, a malicious user can be effectively prevented from faking an asset that does not exist and using the faked asset for transfer.

In addition, it is worthwhile to note that if the blockchain virtual machine triggers execution of the input/output check logic and the amount check logic based on the input/output check instruction and the amount check instruction in the service smart contract, a stack transfer method is generally used in an execution process for data transfer. The following Embodiment 14 provides another transfer method (a pre-compiled contract method) based on a blockchain smart contract.

Embodiment 14

Figure 19:
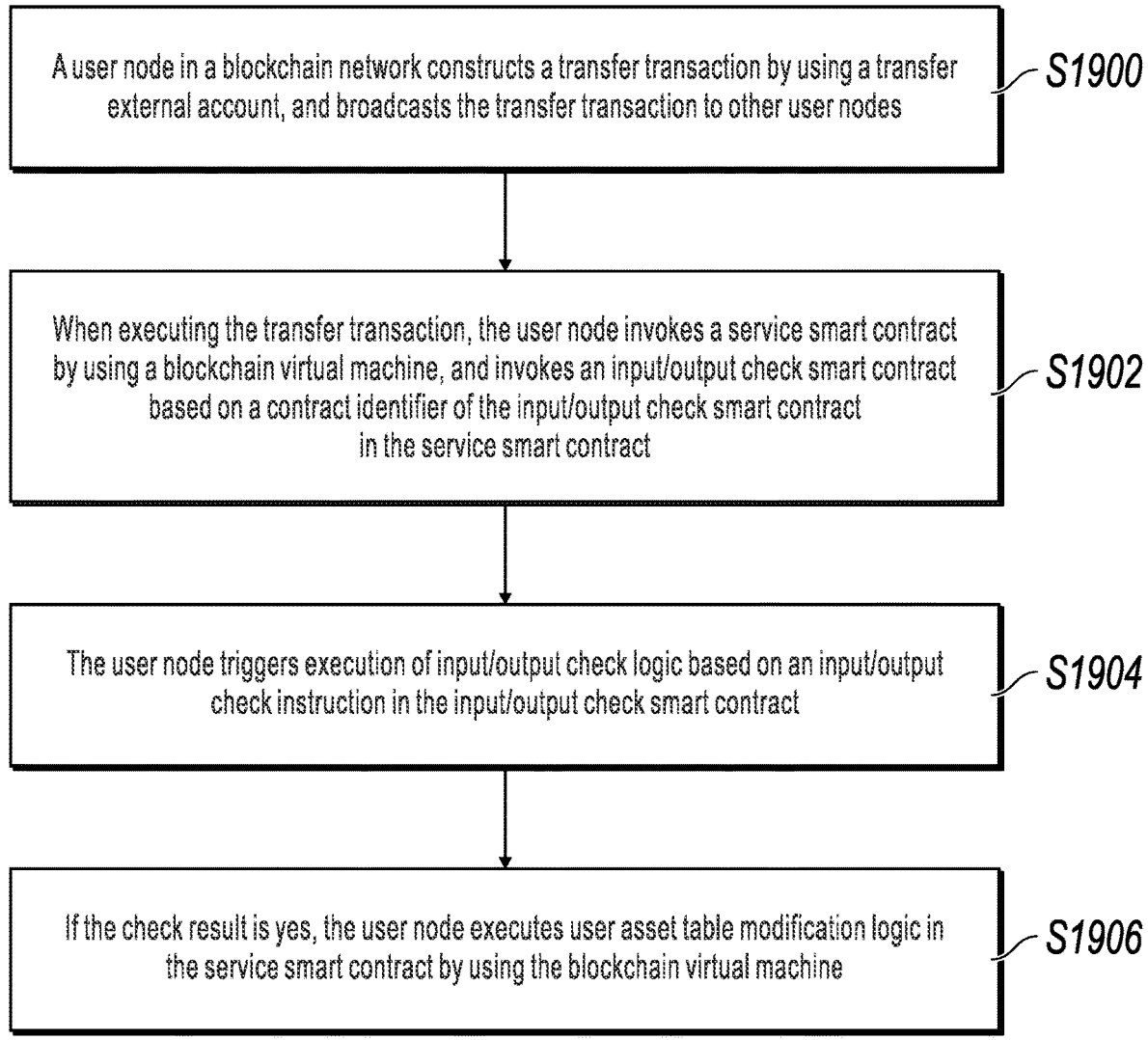
FIG. 19 is a schematic flowchart illustrating a transaction hash acquisition method based on a blockchain smart contract, according to some embodiments of the present specification.

FIG. 19 is a schematic flowchart illustrating a transaction hash acquisition method based on a blockchain smart contract, according to some embodiments of the present specification. The method includes the following steps:

S1900: A node in a blockchain network obtains a transfer transaction by using an external transfer account, and broadcasts the transfer transaction to other nodes.

S1902: When executing the transfer transaction, each node in the blockchain network invokes a service smart contract by using a blockchain virtual machine, and invokes an input/output check smart contract based on a contract identifier of the input/output check smart contract in the service smart contract.

S1904: The node triggers execution of input/output check logic based on an input/output check instruction in the input/output check smart contract.

S1906: If the check result is yes, the node executes user asset table modification logic in the service smart contract by using the blockchain virtual machine.

In Embodiment 14, the blockchain network needs to be pre-configured, so the following can be implemented:

(1) An instruction set of the blockchain virtual machine includes an input/output check instruction, and input/output check logic corresponding to the input/output check instruction is deployed in the blockchain virtual machine.

(2) An instruction set of a smart contract compiler includes the input/output check instruction, the service smart contract compiled by using the smart contract compiler includes the contract identifier of the input/output check smart contract, and the input/output check smart contract is a smart contract pre-deployed in the blockchain network.

(3) The service smart contract is deployed in the blockchain network.

A difference between Embodiment 14 and Embodiment 13 mainly lies in the following: In Embodiment 14, after the blockchain virtual machine invokes the service smart contract, when the blockchain virtual machine reads the contract identifier of the input/output check smart contract, it is equivalent to determining that the input/output check smart contract needs to be further invoked. The blockchain virtual machine invokes the input/output check smart contract, and also reads bytecode or binary code in the input/output check smart contract. When the blockchain virtual machine reads the input/output check instruction, it is equivalent to determining that an input/output check operation needs to be performed. Therefore, the blockchain virtual machine triggers execution of the locally pre-deployed input/output check logic.

That is, in Embodiment 14, when the smart contract compiler compiles the service smart contract, if the smart contract compiler finds that invoking of the input/output check operation is declared in the service smart contract, the smart contract compiler compiles the declaration into the contract identifier of the input/output check smart contract instead of the input/output check instruction. As such, when invoking the service smart contract, the blockchain virtual machine further invokes the input/output check smart contract.

Further, in Embodiment 14, the blockchain network needs to be pre-configured, so the following can be implemented:

(4) The instruction set of the blockchain virtual machine further includes an amount check instruction, and amount check logic corresponding to the amount check instruction is further deployed in the blockchain virtual machine.

(5) The instruction set of the smart contract compiler further includes the amount check instruction, the service smart contract compiled by using the smart contract compiler further includes a contract identifier of an amount check smart contract, and the amount check smart contract is a smart contract pre-deployed in the blockchain network.

As such, in Embodiment 14, each node in the blockchain network invokes the amount check smart contract based on the contract identifier of the amount check smart contract in the service smart contract by using the blockchain virtual machine. The node triggers execution of the amount check logic based on the amount check instruction in the amount check smart contract, to check, based on proof-related data, whether both an amount of a transfer asset and an amount of a change asset fall into a specified value range.

In addition, it is worthwhile to note that, in Embodiment 14, an executed check event is consistent with that in Embodiment 13. However, input/output check and amount check are implemented by invoking a pre-compiled contract (namely, the input/output check smart contract and the amount check smart contract).

In Embodiment 13 and Embodiment 14, when there are a plurality of check events performed for the transfer transaction, only when all check results are yes, the blockchain virtual machine executes the user asset table modification logic.

Figure 20A:
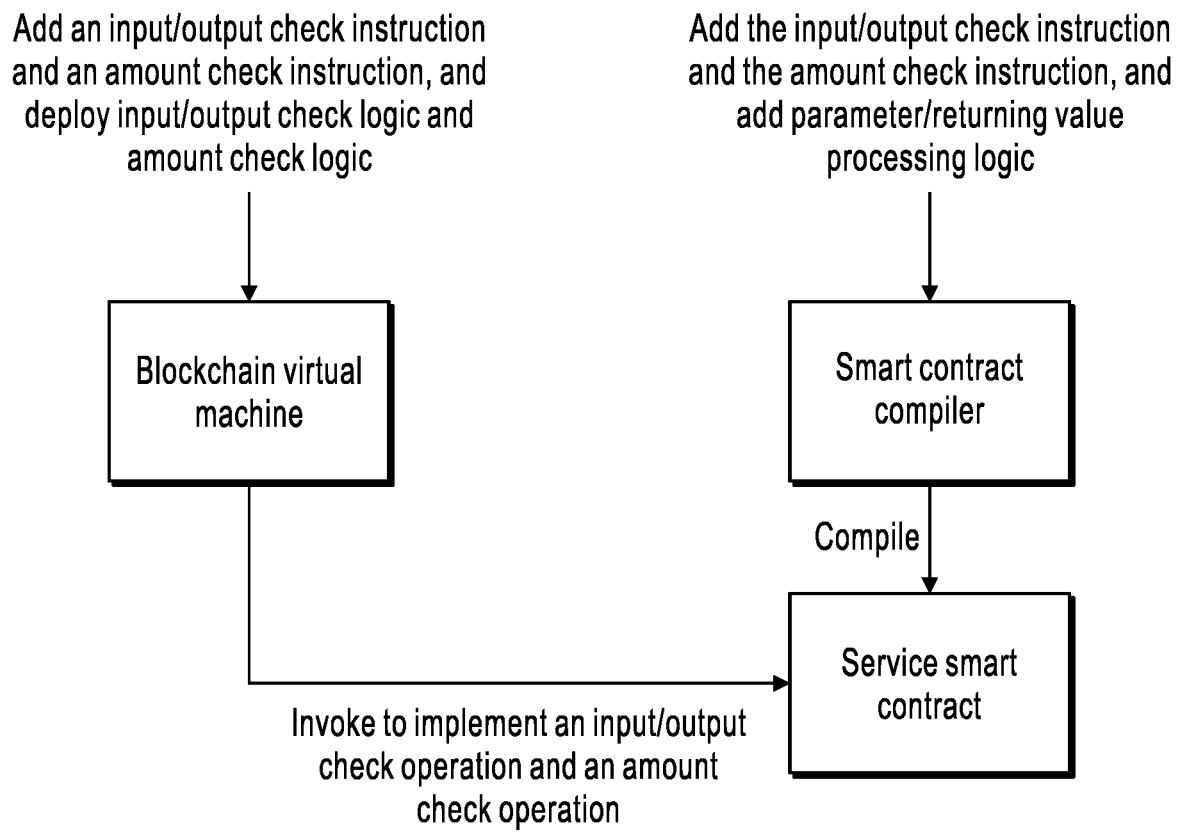
FIG. 20a and FIG. 20b are schematic diagrams illustrating deployment of a check operation related to a transfer transaction, according to some embodiments of the present specification.

FIG. 20a is a schematic diagram illustrating deployment of a check operation related to a transfer transaction corresponding to Embodiment 13, according to some embodiments of the present specification. As shown in FIG. 20a, first, the input/output check instruction and the amount check instruction are added to the instruction set of the blockchain virtual machine, and the input/output check logic and the amount check logic are deployed in the blockchain virtual machine. Second, the input/output check instruction and the amount check instruction are added to the instruction set of the smart contract compiler. Third, the service smart contract (which includes the input/output check instruction and the amount check instruction) compiled by using the smart contract compiler is deployed in the blockchain network.

Figure 20B:
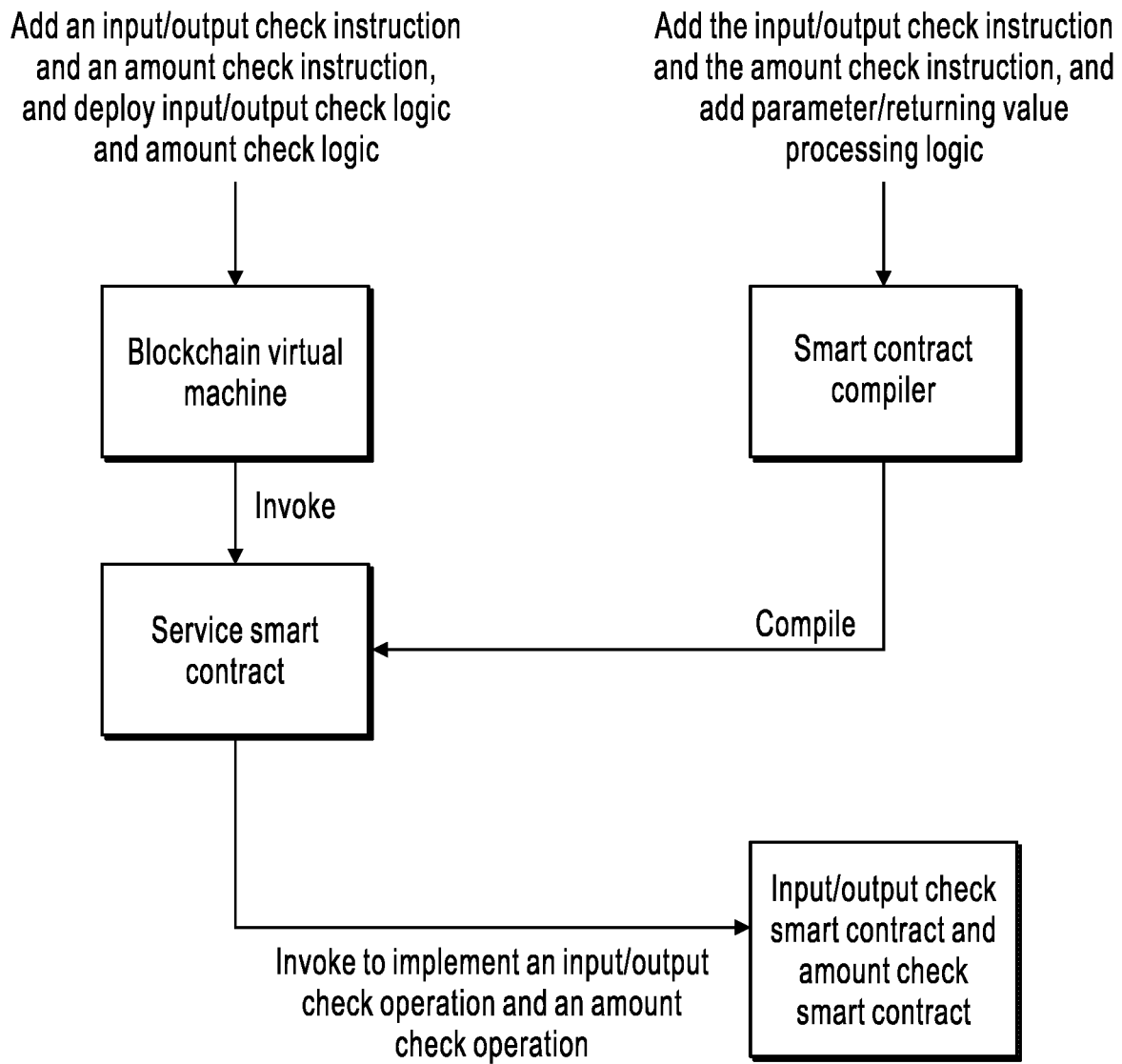

FIG. 20b is a schematic diagram illustrating deployment of a check operation related to a transfer transaction corresponding to Embodiment 14, according to some embodiments of the present specification. As shown in FIG. 20b, first, the input/output check instruction and the amount check instruction are added to the instruction set of the blockchain virtual machine, and the input/output check logic and the amount check logic are deployed in the blockchain virtual machine. Second, the input/output check instruction and the amount check instruction are added to the instruction set of the smart contract compiler. Third, the service smart contract (which includes the contract identifier of the input/output check smart contract and the contract identifier of the amount check smart contract) compiled by using the smart contract compiler is deployed in the blockchain network.

Embodiment 1 to Embodiment 14 are separately described above. In practice, the service initiation transaction can be specifically a transfer transaction. To implement the transfer transaction, related check (for example, various check mentioned in Embodiment 13) may need to be performed, and one or more of a BASE64 encoding operation, a BASE64 decoding operation, an RSA signature verification operation, a JSON processing operation, an XML processing operation, and a transaction hash acquisition operation further needs to be performed.

That is, one or more of the BASE64 encoding method, the BASE64 decoding method, the RSA signature verification method, the JSON processing method, the XML processing method, and the transaction hash acquisition method can be applied to the transfer method in Embodiment 13 or Embodiment 14. In this case, the previous service initiation transaction is a transfer transaction.

In addition, it is worthwhile to note that in the embodiments of the present specification, if the service smart contract is not the only smart contract in the blockchain network, the service initiation transaction (and the transfer transaction) further needs to include a contract identifier of the service smart contract, so the blockchain virtual machine invokes the corresponding service smart contract based on the contract identifier included in the service initiation transaction (and the transfer transaction).

In addition, in the embodiments of the present specification, the instruction set of the blockchain virtual machine further includes at least one Ethereum instruction, and the Ethereum instruction is an instruction in an instruction set of the EVM. Relevant logic corresponding to each Ethereum instruction included in the instruction set of the blockchain virtual machine is deployed in the blockchain virtual machine. The instruction set of the smart contract compiler further includes at least one Ethereum instruction, and the Ethereum instruction is an instruction in the instruction set of the EVM. That is, the blockchain virtual machine in the present application can be obtained by expanding the EVM, and the smart contract compiler in the present application can be obtained by expanding the Ethereum smart contract compiler.

A blockchain system provided in the present specification includes a blockchain network.

An instruction set of a blockchain virtual machine includes an input/output check instruction, and input/output check logic corresponding to the input/output check instruction is deployed in the blockchain virtual machine. An instruction set of a smart contract compiler includes the input/output check instruction, and a service smart contract compiled by using the smart contract compiler includes the input/output check instruction. The service smart contract is deployed in the blockchain network. The service smart contract corresponds to a user asset table, and the user asset table is used to record an asset corresponding to each external account. Any asset is data that includes an encrypted amount, and the encrypted amount is obtained after an amount of the asset is encrypted.

A node in the blockchain network obtains a transfer transaction by using an external transfer account, and broadcasts the transfer transaction to other nodes. The transfer transaction includes a transfer asset, a change asset, and at least one expense asset.

When executing the transfer transaction, each node in the blockchain network invokes the service smart contract by using the blockchain virtual machine, and triggers execution of the input/output check logic based on the input/output check instruction in the service smart contract, to check, by using a homomorphic encryption algorithm, whether the sum of an amount of the transfer asset and an amount of the change asset is equal to the sum of amounts of expense assets. If the check result is yes, the node executes user asset table modification logic in the service smart contract by using the blockchain virtual machine, to release a correspondence between the external transfer account and each expense asset, establish a correspondence between the external transfer account and the change asset, and establish a correspondence between an external collection account and the transfer asset.

A blockchain system provided in the present specification includes a blockchain network.

An instruction set of a blockchain virtual machine includes an input/output check instruction, and input/output check logic corresponding to the input/output check instruction is deployed in the blockchain virtual machine. An instruction set of a smart contract compiler includes the input/output check instruction, a service smart contract compiled by using the smart contract compiler includes a contract identifier of an input/output check smart contract, and the input/output check smart contract is a smart contract pre-deployed in the blockchain network. The service smart contract is deployed in the blockchain network. The service smart contract corresponds to a user asset table, and the user asset table is used to record an asset corresponding to each external account. Any asset is data that includes an encrypted amount, and the encrypted amount is obtained after an amount of the asset is encrypted.

A node in the blockchain network obtains a transfer transaction by using an external transfer account, and broadcasts the transfer transaction to other nodes. The transfer transaction includes a transfer asset, a change asset, and at least one expense asset.

When executing the transfer transaction, each node in the blockchain network invokes the service smart contract by using the blockchain virtual machine, invokes the input/output check smart contract based on the contract identifier of the input/output check smart contract in the service smart contract, and triggers execution of the input/output check logic based on the input/output check instruction in the input/output check smart contract, to check, by using a homomorphic encryption algorithm, whether the sum of an amount of the transfer asset and an amount of the change asset is equal to the sum of amounts of expense assets. If the check result is yes, the node executes user asset table modification logic in the service smart contract by using the blockchain virtual machine, to release a correspondence between the external transfer account and each expense asset, establish a correspondence between the external transfer account and the change asset, and establish a correspondence between an external collection account and the transfer asset.

A blockchain system provided in the present specification includes a blockchain network.

An instruction set of a blockchain virtual machine includes a BASE64 encoding instruction, and BASE64 encoding logic corresponding to the BASE64 encoding instruction is deployed in the blockchain virtual machine. An instruction set of a smart contract compiler includes the BASE64 encoding instruction, and a service smart contract compiled by using the smart contract compiler includes the BASE64 encoding instruction. The service smart contract is deployed in the blockchain network.

A node in the blockchain network obtains a service initiation transaction, and broadcasts the service initiation transaction to other nodes.

When executing the service initiation transaction, each node in the blockchain network invokes the service smart contract by using the blockchain virtual machine, and triggers execution of the BASE64 encoding logic based on the BASE64 encoding instruction in the service smart contract by using the blockchain virtual machine to perform an encoding operation on data to be encoded.

A blockchain system provided in the present specification includes a blockchain network.

An instruction set of a blockchain virtual machine includes a BASE64 encoding instruction, and BASE64 encoding logic corresponding to the BASE64 encoding instruction is deployed in the blockchain virtual machine. An instruction set of a smart contract compiler includes the BASE64 encoding instruction, a service smart contract compiled by using the smart contract compiler includes a contract identifier of a BASE64 encoding smart contract, and the BASE64 encoding smart contract is a smart contract pre-deployed in the blockchain network. The service smart contract is deployed in the blockchain network.

A node in the blockchain network obtains a service initiation transaction, and broadcasts the service initiation transaction to other nodes.

When executing the service initiation transaction, each node in the blockchain network invokes the service smart contract by using the blockchain virtual machine, invokes the BASE64 encoding smart contract based on the contract identifier of the BASE64 encoding smart contract in the service smart contract by using the blockchain virtual machine, and triggers execution of the BASE64 encoding logic based on the BASE64 encoding instruction in the BASE64 encoding smart contract by using the blockchain virtual machine to perform an encoding operation on data to be encoded.

A blockchain system provided in the present specification includes a blockchain network.

An instruction set of a blockchain virtual machine includes a BASE64 decoding instruction, and BASE64 decoding logic corresponding to the BASE64 decoding instruction is deployed in the blockchain virtual machine. An instruction set of a smart contract compiler includes the BASE64 decoding instruction, and a service smart contract compiled by using the smart contract compiler includes the BASE64 decoding instruction. The service smart contract is deployed in the blockchain network.

A node in the blockchain network obtains a service initiation transaction, and broadcasts the service initiation transaction to other nodes.

When executing the service initiation transaction, each node in the blockchain network invokes the service smart contract by using the blockchain virtual machine, and triggers execution of the BASE64 decoding logic based on the BASE64 decoding instruction in the service smart contract by using the blockchain virtual machine to perform a decoding operation on data to be decoded.

A blockchain system provided in the present specification includes a blockchain network.

An instruction set of a blockchain virtual machine includes a BASE64 decoding instruction, and BASE64 decoding logic corresponding to the BASE64 decoding instruction is deployed in the blockchain virtual machine. An instruction set of a smart contract compiler includes the BASE64 decoding instruction, a service smart contract compiled by using the smart contract compiler includes a contract identifier of a BASE64 decoding smart contract, and the BASE64 decoding smart contract is a smart contract pre-deployed in the blockchain network. The service smart contract is deployed in the blockchain network.

A node in the blockchain network obtains a service initiation transaction, and broadcasts the service initiation transaction to other nodes.

When executing the service initiation transaction, each node in the blockchain network invokes the service smart contract by using the blockchain virtual machine, invokes the BASE64 decoding smart contract based on the contract identifier of the BASE64 decoding smart contract in the service smart contract by using the blockchain virtual machine, and triggers execution of the BASE64 decoding logic based on the BASE64 decoding instruction in the BASE64 decoding smart contract by using the blockchain virtual machine to perform a decoding operation on data to be decoded.

A blockchain system provided in the present specification includes a blockchain network.

An instruction set of a blockchain virtual machine includes an RSA signature verification instruction, and RSA signature verification logic corresponding to the RSA signature verification instruction is deployed in the blockchain virtual machine. An instruction set of a smart contract compiler includes the RSA signature verification instruction, and a service smart contract compiled by using the smart contract compiler includes the RSA signature verification instruction. The service smart contract is deployed in the blockchain network.

A node in the blockchain network obtains a service initiation transaction, and broadcasts the service initiation transaction to other nodes.

When executing the service initiation transaction, each node in the blockchain network invokes the service smart contract by using the blockchain virtual machine, and triggers execution of the RSA signature verification logic based on the RSA signature verification instruction in the service smart contract by using the blockchain virtual machine to perform an RSA signature verification operation on a service signature.

A blockchain system provided in the present specification includes a blockchain network.

An instruction set of a blockchain virtual machine includes an RSA signature verification instruction, and RSA signature verification logic corresponding to the RSA signature verification instruction is deployed in the blockchain virtual machine. An instruction set of a smart contract compiler includes the RSA signature verification instruction, a service smart contract compiled by using the smart contract compiler includes a contract identifier of an RSA signature verification smart contract, and the RSA signature verification smart contract is a smart contract pre-deployed in the blockchain network. The service smart contract is deployed in the blockchain network.

A node in the blockchain network obtains a service initiation transaction, and broadcasts the service initiation transaction to other nodes.

When executing the service initiation transaction, each node in the blockchain network invokes the service smart contract by using the blockchain virtual machine, invokes the RSA signature verification smart contract based on the contract identifier of the RSA signature verification smart contract in the service smart contract by using the blockchain virtual machine, and triggers execution of the RSA signature verification logic based on the RSA signature verification instruction in the RSA signature verification smart contract by using the blockchain virtual machine to perform an RSA signature verification operation on a service signature.

A blockchain system provided in the present specification includes a blockchain network.

An instruction set of a blockchain virtual machine includes a JSON processing instruction, and JSON processing logic corresponding to the JSON processing instruction is deployed in the blockchain virtual machine. An instruction set of a smart contract compiler includes the JSON processing instruction, and a service smart contract compiled by using the smart contract compiler includes the JSON processing instruction. The service smart contract is deployed in the blockchain network.

A node in the blockchain network obtains a service initiation transaction, and broadcasts the service initiation transaction to other nodes.

When executing the service initiation transaction, each node in the blockchain network invokes the service smart contract by using the blockchain virtual machine, and triggers execution of the JSON processing logic based on the JSON processing instruction in the service smart contract by using the blockchain virtual machine to perform a JSON processing operation on data to be processed.

A blockchain system provided in the present specification includes a blockchain network.

An instruction set of a blockchain virtual machine includes a JSON processing instruction, and JSON processing logic corresponding to the JSON processing instruction is deployed in the blockchain virtual machine. An instruction set of a smart contract compiler includes the JSON processing instruction, a service smart contract compiled by using the smart contract compiler includes a contract identifier of a JSON processing smart contract, and the JSON processing smart contract is a smart contract pre-deployed in the blockchain network. The JSON processing smart contract and the service smart contract are deployed in the blockchain network.

A node in the blockchain network obtains a service initiation transaction, and broadcasts the service initiation transaction to other nodes.

When executing the service initiation transaction, each node in the blockchain network invokes the service smart contract by using the blockchain virtual machine, invokes the JSON processing smart contract based on the contract identifier of the JSON processing smart contract in the service smart contract by using the blockchain virtual machine, and triggers execution of the JSON processing logic based on the JSON processing instruction in the JSON processing smart contract by using the blockchain virtual machine to perform a JSON processing operation on data to be processed.

A blockchain system provided in the present specification includes a blockchain network.

An instruction set of a blockchain virtual machine includes an XML processing instruction, and XML processing logic corresponding to the XML processing instruction is deployed in the blockchain virtual machine. An instruction set of a smart contract compiler includes the XML processing instruction, and a service smart contract compiled by using the smart contract compiler includes the XML processing instruction. The service smart contract is deployed in the blockchain network.

A node in the blockchain network obtains a service initiation transaction, and broadcasts the service initiation transaction to other nodes.

When executing the service initiation transaction, each node in the blockchain network invokes the service smart contract by using the blockchain virtual machine, and triggers execution of the XML processing logic based on the XML processing instruction in the service smart contract by using the blockchain virtual machine to perform an XML processing operation on data to be processed.

A blockchain system provided in the present specification includes a blockchain network.

An instruction set of a blockchain virtual machine includes an XML processing instruction, and XML processing logic corresponding to the XML processing instruction is deployed in the blockchain virtual machine. An instruction set of a smart contract compiler includes the XML processing instruction, a service smart contract compiled by using the smart contract compiler includes a contract identifier of an XML processing smart contract, and the XML processing smart contract is a smart contract pre-deployed in the blockchain network. The XML processing smart contract and the service smart contract are deployed in the blockchain network.

A node in the blockchain network obtains a service initiation transaction, and broadcasts the service initiation transaction to other nodes.

When executing the service initiation transaction, each node in the blockchain network invokes the service smart contract by using the blockchain virtual machine, invokes the XML processing smart contract based on the contract identifier of the XML processing smart contract in the service smart contract by using the blockchain virtual machine, and triggers execution of the XML processing logic based on the XML processing instruction in the XML processing smart contract by using the blockchain virtual machine to perform an XML processing operation on data to be processed.

A blockchain system provided in the present specification includes a blockchain network.

An instruction set of a blockchain virtual machine includes a transaction hash acquisition instruction, and transaction hash acquisition logic corresponding to the transaction hash acquisition instruction is deployed in the blockchain virtual machine. An instruction set of a smart contract compiler includes the transaction hash acquisition instruction, and a service smart contract compiled by using the smart contract compiler includes the transaction hash acquisition instruction. The service smart contract is deployed in the blockchain network.

A node in the blockchain network obtains a service initiation transaction, and broadcasts the service initiation transaction to other nodes.

When executing the service initiation transaction, each node in the blockchain network invokes the service smart contract by using the blockchain virtual machine, and triggers execution of the transaction hash acquisition logic based on the transaction hash acquisition instruction in the service smart contract by using the blockchain virtual machine, to obtain a transaction hash of the service initiation transaction.

A blockchain system provided in the present specification includes a blockchain network.

An instruction set of a blockchain virtual machine includes a transaction hash acquisition instruction, and transaction hash acquisition logic corresponding to the transaction hash acquisition instruction is deployed in the blockchain virtual machine. An instruction set of a smart contract compiler includes the transaction hash acquisition instruction, a service smart contract compiled by using the smart contract compiler includes a contract identifier of a transaction hash acquisition smart contract, and the transaction hash acquisition smart contract is a smart contract pre-deployed in the blockchain network. The transaction hash acquisition smart contract and the service smart contract are deployed in the blockchain network.

A node in the blockchain network obtains a service initiation transaction, and broadcasts the service initiation transaction to other nodes; and When executing the service initiation transaction, each node in the blockchain network invokes the service smart contract by using the blockchain virtual machine, invokes the transaction hash acquisition smart contract based on the contract identifier of the transaction hash acquisition smart contract in the service smart contract by using the blockchain virtual machine, and triggers execution of the transaction hash acquisition logic based on the transaction hash acquisition instruction in the transaction hash acquisition smart contract by using the blockchain virtual machine, to obtain a transaction hash of the service initiation transaction.

Figure 21:
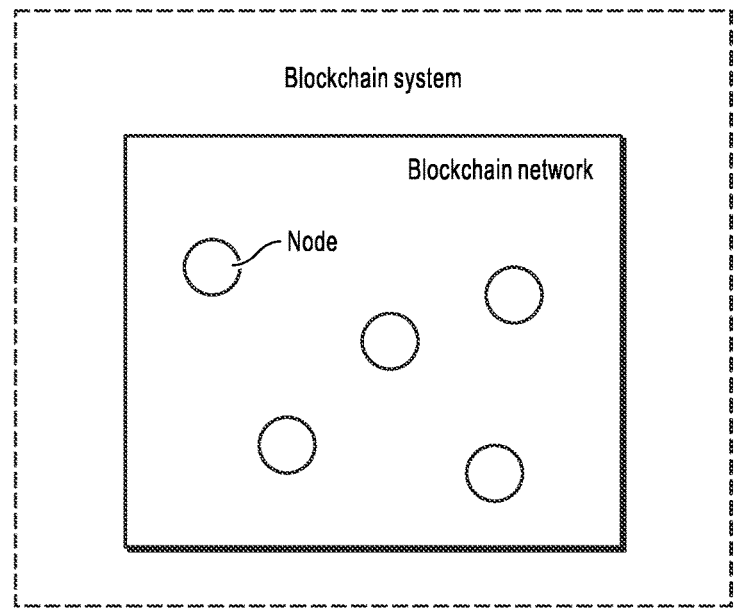
FIG. 21 is a schematic structural diagram illustrating a blockchain system, according to some embodiments of the present specification.

FIG. 21 is a schematic structural diagram illustrating a blockchain system, according to some embodiments of the present specification.

The present specification further provides a computer device. The computer device includes at least a memory, a processor, and a computer program that is stored in the memory and that can run on the processor. When executing the program, the processor implements functions of the methods in the embodiments of the present specification and a method combined by at least two of the embodiments.

Figure 22:
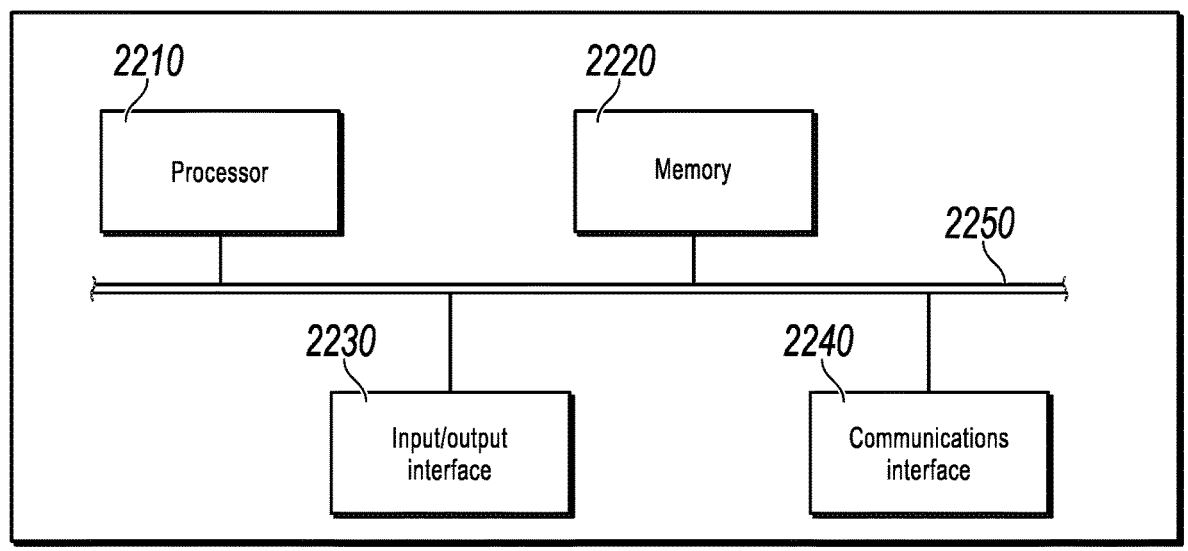
FIG. 22 is a schematic structural diagram illustrating a computer device used to configure a method in some embodiments of the present specification.

FIG. 22 is a more detailed schematic diagram illustrating a hardware structure of a computing device, according to some embodiments of the present specification. The device can include a processor 2210, a memory 2220, an input/output interface 2230, a communications interface 2240, and a bus 2250. The processor 2210, the memory 2220, the input/output interface 2230, and the communications interface 2240 are communicatively connected to each other inside the device by using the bus 2250.

The processor 2210 can be implemented by using a general central processing unit (CPU), a microprocessor, an application-specific integrated circuit (ASIC), one or more integrated circuits, etc., and is configured to execute a related program, to implement the technical solutions provided in the embodiments of the present specification.

The memory 2220 can be implemented by using a read-only memory (ROM), a random access memory (RAM), a static storage device, a dynamic storage device, etc. The memory 2220 can store an operating system and another application program. When the technical solutions provided in the embodiments of the present specification are implemented by using software or firmware, related program code is stored in the memory 2220, and is invoked and executed by the processor 2210.

The input/output interface 2230 is configured to be connected to an input/output module, to input or output information. The input/output module (not shown in the figure) can be used as a component and configured in the device, or can be externally connected to the device, to provide a corresponding function. The input device can include a keyboard, a mouse device, a touchscreen, a microphone, various sensors, etc. The output device can include a monitor, a speaker, a vibrator, an indicator, etc.

The communications interface 2240 is configured to be connected to a communications module (not shown in the figure), to implement communication interaction between the device and another device. The communications module can perform communication in a wired way (for example, USB or a network cable), or can perform communication in a wireless way (for example, a mobile network, Wi-Fi, or Bluetooth).

The bus 2250 includes one channel that is used to transmit information between components (for example, the processor 2210, the memory 2220, the input/output interface 2230, and the communications interface 2240) of the device.

It is worthwhile to note that although only the processor 2210, the memory 2220, the input/output interface 2230, the communications interface 2240, and the bus 2250 of the device are shown, in a specific implementation process, the device can further include other components needed for normal running. In addition, a person skilled in the art can understand that the device can also include only components necessary for implementing the solutions in the embodiments of the present specification, but does not necessarily include all components shown in the figure.

Some embodiments of the present specification further provide a computer readable storage medium on which a computer program is stored. When executing the program, the processor implements functions of the methods in the embodiments of the present specification and a method combined by at least two of the embodiments.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static random access memory (SRAM), a dynamic random access memory (DRAM), a random access memory of another type, a read-only memory (ROM), an electrically erasable programmable read-only memory (EEPROM), a flash memory or another memory technology, a compact disc read-only memory (CD-ROM), a digital versatile disc (DVD) or another optical storage, a cassette, a cassette magnetic disk storage, or another magnetic storage device or any other non-transmission medium. The computer storage medium can be configured to store information that can be accessed by a computing device. As described in the present specification, the computer readable medium does not include computer readable transitory media such as a modulated data signal and a carrier.

It can be understood from the previous descriptions of the embodiments that, a person skilled in the art can clearly understand that the embodiments of the present specification can be implemented by using software and a necessary general hardware platform. Based on such an understanding, the technical solutions in the embodiments of the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, a network device, etc.) to perform the method described in the embodiments of the present specification or in some parts of the embodiments of the present specification.

The system, method, module, or unit illustrated in the previous embodiments can be implemented by using a computer chip or an entity, or can be implemented by using a product having a certain function. Atypical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

The embodiments in the present specification are described in a progressive way. For same or similar parts of the embodiments, references can be made to the embodiments. Each embodiment focuses on a difference from other embodiments. Particularly, an apparatus embodiment and a device embodiment are similar to a method embodiment, and therefore are described briefly. For a related part, references can be made to some descriptions in the method embodiment. The previously described method embodiments are merely examples. The modules described as separate parts can or does not have to be physically separate. During implementation of the solutions in the embodiments of the present specification, functions of the modules can be implemented in one or more pieces of software and/or hardware. Some or all of the modules can be selected based on an actual need to implement the solutions in the embodiments. A person of ordinary skill in the art can understand and implement the embodiments of the present specification without creative efforts.

The previous descriptions are merely specific implementations of the embodiments of the present application. It is worthwhile to note that a person of ordinary skill in the art can further make several improvements or polishing without departing from the principle of the embodiments of the present specification, and the improvements or polishing shall fall within the protection scope of the embodiments of the present specification.

What is claimed is:

1. A computer-implemented method, comprising:
receiving, from a client device and by one or more processors of a node in a blockchain network in which (a) each node comprises a blockchain virtual machine (i) that does not support operations processing XML format data by default, (ii) whose instruction set is expanded to support the operations processing XML format data when the instruction set is executed, by including an XML processing instruction in the instruction set, and (iii) in which XML processing logic corresponding to the XML processing instruction is deployed, and (b) a service smart contract comprising the XML processing instruction is deployed, a service initiation transaction that is broadcasted by the client device to nodes in the blockchain network,
wherein the service smart contract is compiled by a smart contract compiler whose instruction set is expanded to include the XML processing instruction, such that the compiled service smart contract comprises the XML processing instruction;
invoking, by the one or more processors of the node in the blockchain network using the blockchain virtual machine, the service smart contract; and
triggering, by the one or more processors of the node in the blockchain network using the blockchain virtual machine, execution of the XML processing logic based on the XML processing instruction in the service smart contract to perform XML processing operations on data to be processed.

2. The computer-implemented method of claim 1, wherein the service initiation transaction comprises the data to be processed; or
the service smart contract comprises the data to be processed; or
the data to be processed is generated when the service initiation transaction is executed.

3. The computer-implemented method of claim 1, wherein the service smart contract compiled by the smart contract compiler comprises a contract identifier of an XML processing smart contract, and the XML, processing smart contract is a smart contract pre-deployed in the blockchain network.

4. The computer-implemented method of claim 3, further comprising:
invoking, using the blockchain virtual machine, the service smart contract;
invoking, using the blockchain virtual machine, the XML processing smart contract based on the contract identifier of the XML processing smart contract in the service smart contract; and
triggering, using the blockchain virtual machine, execution of the XML processing logic based on the XML processing instruction in the XML processing smart contract to perform the XML processing operations on the data to be processed.

5. The computer-implemented method of claim 1, wherein the instruction set of the blockchain virtual machine further comprises at least one Ethereum instruction, and the Ethereum instruction is an instruction in an instruction set of an Ethereum virtual machine; and
logic corresponding to each Ethereum instruction comprised in the instruction set of the blockchain virtual machine is deployed in the blockchain virtual machine.

6. The computer-implemented method of claim 1, wherein the smart contract compiler is configured to compile a smart contract written in a programming language into a machine language.

7. The computer-implemented method of claim 1, wherein the service smart contract complied by the smart contract compiler is in a form of bytecode or binary code.

8. A non-transitory, computer-readable medium storing one or more instructions executable by a computer system to perform operations comprising:

receiving, from a client device and by one or more processors of a node in a blockchain network in which (a) each node comprises a blockchain virtual machine (i) that does not support operations processing XML format data by default, (ii) whose instruction set is expanded to support the operations processing XML format data when the instruction set is executed, by including an XML processing instruction in the instruction set, and (iii) in which XML processing logic corresponding to the XML processing instruction is deployed, and (b) a service smart contract comprising the XML processing instruction is deployed, a service initiation transaction that is broadcasted by the client device to nodes in the blockchain network, wherein the service smart contract is compiled by a smart contract compiler whose instruction set is expanded to include the XML processing instruction, such that the compiled service smart contract comprises the XML processing instruction;

invoking, by the one or more processors of the node in the blockchain network using the blockchain virtual machine, the service smart contract; and triggering, by the one or more processors of the node in the blockchain network using the blockchain virtual machine, execution of the XML processing logic based on the XML processing instruction in the service smart contract to perform XML processing operations on data to be processed.

9. The non-transitory, computer-readable medium of claim 8, wherein the service initiation transaction comprises the data to be processed; or the service smart contract comprises the data to be processed; or the data to be processed is generated when the service initiation transaction is executed.

10. The non-transitory, computer-readable medium of claim 8, wherein the service smart contract compiled by the smart contract compiler comprises a contract identifier of an XML processing smart contract, and the XML processing smart contract is a smart contract pre-deployed in the blockchain network.

11. The non-transitory, computer-readable medium of claim 10, wherein the operations further comprise:

invoking, using the blockchain virtual machine, the service smart contract;

invoking, using the blockchain virtual machine, the XML processing smart contract based on the contract identifier of the XML processing smart contract in the service smart contract; and triggering, using the blockchain virtual machine, execution of the XML processing logic based on the XML processing instruction in the XML processing smart contract to perform the XML processing operations on the data to be processed.

12. The non-transitory, computer-readable medium of claim 8, wherein the instruction set of the blockchain virtual machine further comprises at least one Ethereum instruction, and the Ethereum instruction is an instruction in an instruction set of an Ethereum virtual machine; and logic corresponding to each Ethereum instruction comprised in the instruction set of the blockchain virtual machine is deployed in the blockchain virtual machine.

13. The non-transitory, computer-readable medium of claim 8, wherein the smart contract compiler is configured to compile a smart contract written in a programming language into a machine language.

14. The non-transitory, computer-readable medium of claim 8, wherein the service smart contract complied by the smart contract compiler is in a form of bytecode or binary code.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

receiving, from a client device and by one or more processors of a node in a blockchain network in which (a) each node comprises a blockchain virtual machine (i) that does not support operations processing XML, format data by default, (ii) whose instruction set is expanded to support the operations processing XML format data when the instruction set is executed, by including an XML processing instruction in the instruction set, and (iii) in which XML processing logic corresponding to the XML processing instruction is deployed, and (b) a service smart contract comprising the XML processing instruction is deployed, a service initiation transaction that is broadcasted by the client device to nodes in the blockchain network, wherein the service smart contract is compiled by a smart contract compiler whose instruction set is expanded to include the XML processing instruction, such that the compiled service smart contract comprises the XML processing instruction;

invoking, by the one or more processors of the node in the blockchain network using the blockchain virtual machine, the service smart contract; and triggering, by the one or more processors of the node in the blockchain network using the blockchain virtual machine, execution of the XML processing logic based on the XML processing instruction in the service smart contract to perform XML processing operations on data to be processed.

16. The computer-implemented system of claim 15, wherein the service initiation transaction comprises the data to be processed; or the service smart contract comprises the data to be processed; or the data to be processed is generated when the service initiation transaction is executed.

17. The computer-implemented system of claim 15, wherein the service smart contract compiled by the smart contract compiler comprises a contract identifier of an XML processing smart contract, and the XML, processing smart contract is a smart contract pre-deployed in the blockchain network.

18. The computer-implemented system of claim 17, wherein the one or more operations further comprise:

invoking, using the blockchain virtual machine, the service smart contract;

invoking, using the blockchain virtual machine, the XML processing smart contract based on the contract identifier of the XML processing smart contract in the service smart contract; and triggering, using the blockchain virtual machine, execution of the XML processing logic based on the XML processing instruction in the XML processing smart contract to perform the XML processing operations on the data to be processed.

19. The computer-implemented system of claim 15, wherein the instruction set of the blockchain virtual machine further comprises at least one Ethereum instruction, and the Ethereum instruction is an instruction in an instruction set of an Ethereum virtual machine; and logic corresponding to each Ethereum instruction comprised in the instruction set of the blockchain virtual machine is deployed in the blockchain virtual machine.

20. The computer-implemented system of claim 15, wherein the smart contract compiler is configured to compile a smart contract written in a programming language into a machine language.

* * * * *

UNITED STATES PATENT AND TRADEMARK OFFICE
CERTIFICATE OF CORRECTION

PATENT NO. : 11,327,959 B2
APPLICATION NO. : 17/160136
DATED : May 10, 2022
INVENTOR(S) : Guilu Xie Page 1 of 1

It is certified that error appears in the above-identified patent and that said Letters Patent is hereby corrected as shown below:

In the Claims

Column 36, Line 40, in Claim 3, delete "XML," and insert -- XML --.

Column 38, Line 24, in Claim 15, delete "XML," and insert -- XML --.

Column 38, Line 59, in Claim 17, delete "XML," and insert -- XML --.

Signed and Sealed this
Twenty-seventh Day of December, 2022

Katherine Kelly Vidal
*Director of the United States Patent and Trademark Office*